(12) United States Patent
Ménard et al.

(10) Patent No.: US 10,852,530 B2
(45) Date of Patent: Dec. 1, 2020

(54) MICRO-MOTOR BASED SWEPT WAVELENGTH OPTICAL COMPONENTS

(71) Applicant: TRANSFERT PLUS, SOCIETE EN COMMANDITE, Montreal (CA)

(72) Inventors: Michaël Ménard, Verdun (CA); Fréderic Nabki, Montreal (CA); Mohannad Elsayed, Verdun (CA)

(73) Assignee: Transfert Plus, Societe en Commandite, Montreal (CA)

( * ) Notice: Subject to any disclaimer, the term of this patent is extended or adjusted under 35 U.S.C. 154(b) by 0 days.

(21) Appl. No.: 16/214,544

(22) Filed: Dec. 10, 2018

(65) Prior Publication Data

US 2019/0179136 A1 Jun. 13, 2019

Related U.S. Application Data

(60) Provisional application No. 62/596,282, filed on Dec. 8, 2017.

(51) Int. Cl.
*G02B 6/12* (2006.01)
*G02B 26/08* (2006.01)
(Continued)

(52) U.S. Cl.
CPC ............ *G02B 26/0841* (2013.01); *G02B 1/11* (2013.01); *G02B 6/124* (2013.01); *G02B 6/29328* (2013.01); *G02B 6/3518* (2013.01); *G02B 6/3596* (2013.01); *G02B 26/124* (2013.01); *G02B 6/12004* (2013.01); *G02B 6/136* (2013.01); *G02B 6/3516* (2013.01); *G02B 6/3534* (2013.01); *G02B 6/3574* (2013.01); *G02B 2006/12038* (2013.01); (Continued)

(58) Field of Classification Search
None
See application file for complete search history.

(56) References Cited

U.S. PATENT DOCUMENTS

| 2,524,530 A * | 10/1950 | Lawson | H03K 4/28 |
| | | | 327/139 |
| 4,943,750 A * | 7/1990 | Howe | H02N 1/004 |
| | | | 310/309 |
| 5,015,906 A * | 5/1991 | Cho | G01P 15/08 |
| | | | 310/309 |
| 5,187,399 A * | 2/1993 | Carr | H02N 1/004 |
| | | | 310/309 |

(Continued)

*Primary Examiner* — Michael Stahl
(74) *Attorney, Agent, or Firm* — Rosenberg, Klein & Lee

(57) ABSTRACT

Optical spectroscopy is a widely used method to identify the chemical composition of materials and the characteristics of optical signals. Silicon based integrated photonics offers a platform for many optical functions through microelectromechanical systems (MEMS) and microoptoelectromechanical systems (MOEMS), silicon waveguides, integrated CMOS electronics and hybrid integration of compound semiconductor elements for optical gain. Accordingly, it would be beneficial to provide advanced optical tools for techniques such as optical spectroscopy and optical tomography exploiting MOEMS to provide swept filters that offer improved performance, increased integration, reduced footprint, reduced power consumption, increased flexibility, reconfigurability, and lower cost. Further, such MOEMS elements can support the provisioning of swept optical sources, swept filters, swept receivers etc. in the planar waveguide domain without free space optics.

19 Claims, 32 Drawing Sheets

(51) Int. Cl.
  *G02B 26/12*   (2006.01)
  *G02B 1/11*    (2015.01)
  *G02B 6/124*   (2006.01)
  *G02B 6/35*    (2006.01)
  *G02B 6/293*   (2006.01)
  *G02B 6/136*   (2006.01)

(52) U.S. Cl.
  CPC .............. *G02B 2006/12061* (2013.01); *G02B 2006/12069* (2013.01); *G02B 2006/12097* (2013.01); *G02B 2006/12104* (2013.01); *G02B 2006/12107* (2013.01); *G02B 2006/12176* (2013.01)

(56) References Cited

U.S. PATENT DOCUMENTS

| | | | | |
|---|---|---|---|---|
| 5,252,881 | A * | 10/1993 | Muller | H02N 1/004 |
| | | | | 310/268 |
| 2002/0096018 | A1* | 7/2002 | Rodgers | B81B 5/00 |
| | | | | 81/3.33 |
| 2002/0114559 | A1* | 8/2002 | Wang | G02B 6/29317 |
| | | | | 385/22 |
| 2003/0156785 | A1* | 8/2003 | Ellis | G02B 6/3506 |
| | | | | 385/25 |
| 2012/0014642 | A1* | 1/2012 | Hanneman, Jr. | G02B 6/353 |
| | | | | 385/16 |
| 2017/0017043 | A1* | 1/2017 | Menard | G02B 6/3518 |
| 2018/0348507 | A1* | 12/2018 | Packirisamy | G02B 26/0841 |

* cited by examiner

950

900

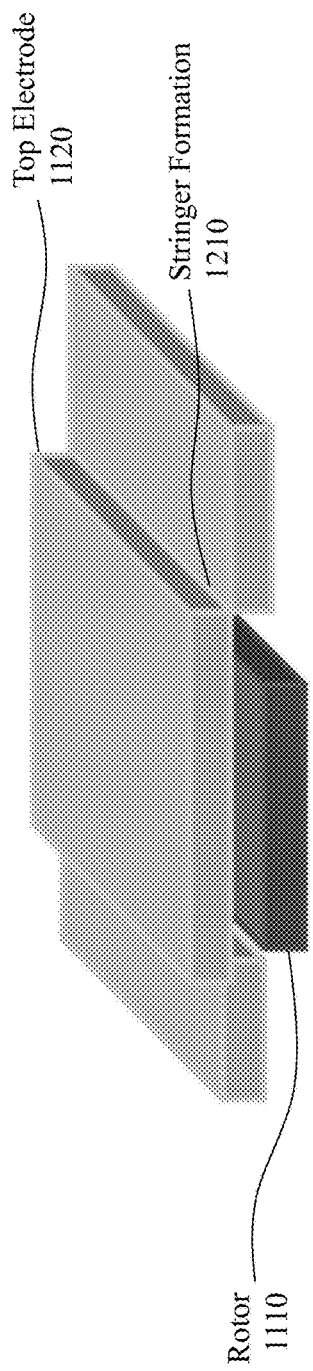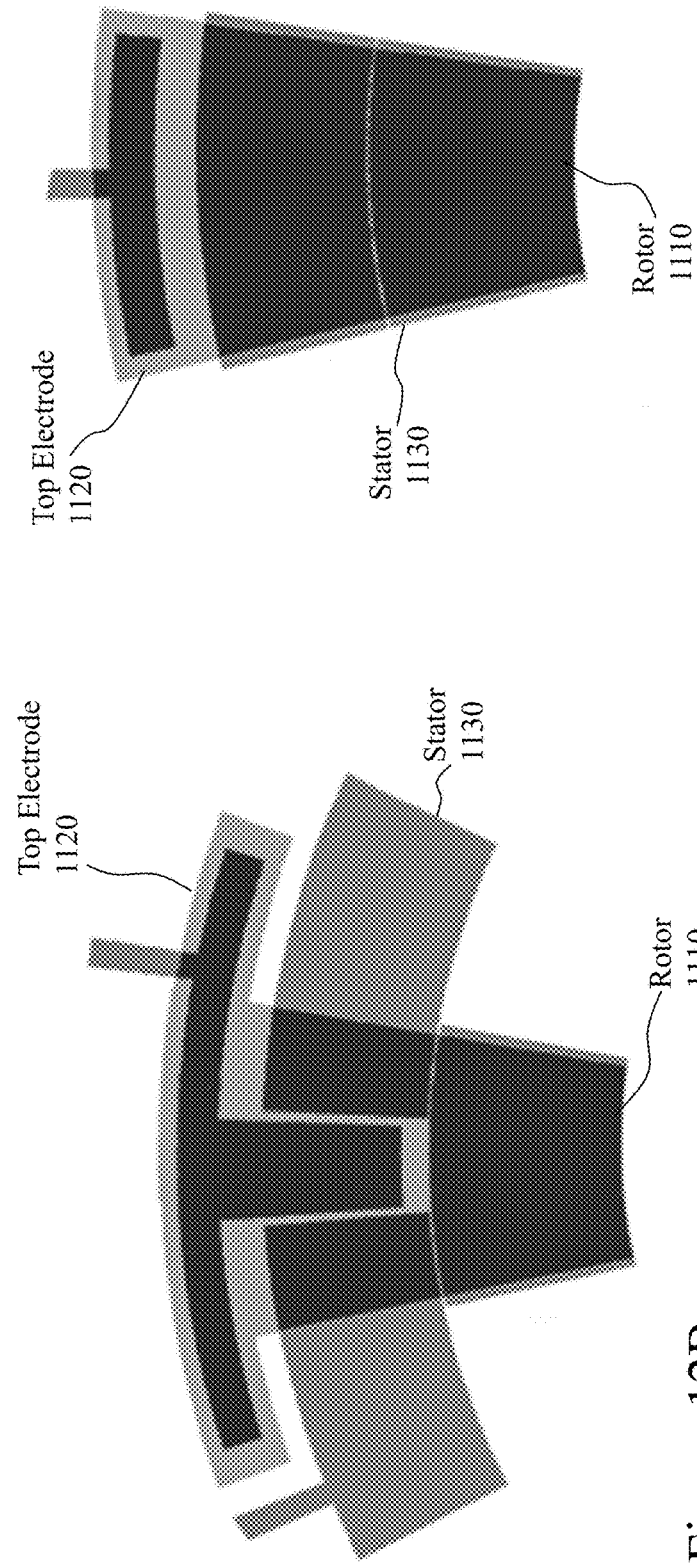
Figure 12A
Figure 12B

MICRO-MOTOR BASED SWEPT WAVELENGTH OPTICAL COMPONENTS

CROSS-REFERENCE TO RELATED APPLICATIONS

This patent application claims the benefit of priority from U.S. Provisional Patent Application 62/596,282 filed on Dec. 8, 2017 entitled "Micro-Motor Based Swept Wavelength Optical Components", the entire contents of this being incorporated herein by reference.

FIELD OF THE INVENTION

This invention relates to microoptoelectromechanical systems (MOEMS) and more particular to designs for optical microelectromechanical systems (MEMS) based swept wavelength components such as sources, filters, and detectors exploiting such optical elements in conjunction with MEMS micro-motors.

BACKGROUND OF THE INVENTION

Dense wavelength division multiplexing (DWDM) and coarse wavelength division multiplexing (CWDM) have enabled telecommunication service providers to fully exploit the transmission capacity of optical fibers within their networks from long haul and ultra-long haul networks to penetrate down into access networks, local area networks and data centers in order to support the continuing inexorable demand for data. Wavelength division multiplexing (WDM) technologies exploit a grid of defined channels with specific center wavelengths, channel spacing, and channel bandwidth. Today, dynamically configurable wavelength tunable transmitters, receivers, and transceivers as well as wavelength dependent add-drop multiplexers, space switches, filters, etc. may be employed allowing fewer components to be stocked as rather than a specific part per channel a single component may operate over multiple channels and potentially a full band such as the 1550 nm C-band.

However, in other applications such as metrology, sensing, and imaging the requirement is for optical components such as optical systems, filters, etc. that continuously adjust their central wavelength of operation. Such components are commonly referred to as swept sources, swept filters, etc. just as their microwave counterparts are and generally exploit a continuously tunable wavelength dependent element, e.g. a swept filter. However, most instances of optical systems and equipment that require this technology have been confined to laboratories, large expensive test equipment, or well controlled environments as the implementation of this type of filter has relied upon sensitive, expensive, and bulky free-space optics. However, in a number of applications it would be desirable to exploit swept filters that offer improved performance, increased integration, reduced footprint, reduced power consumption, increased flexibility, reconfigurability, and lower cost. Elsewhere within the photonic component community this has been achieved by replacing multiple discrete components and/or hybrid assembles with monolithically integrated circuits.

Silicon based integrated photonics offers a platform for many optical functions through microelectromechanical systems (MEMS) and microoptoelectromechanical systems (MOEMS), silicon waveguides, integrated CMOS electronics and hybrid integration of compound semiconductor elements for optical gain. However, within the prior art the majority of MEMS and MOEMS devices have been designed either for free space optical interconnections or for DWDM/CWDM applications. Accordingly, it would be beneficial to provide optical component designers with MOEMS elements supporting the provisioning of swept optical sources, swept filters, swept receivers etc. in the planar waveguide domain without free space optics.

In order to mitigate these limitations and make advanced optical tools more accessible, the inventors have established a novel technology that enables the realisation of integrated optical scanning systems which form the basis of optical systems for optical spectroscopy and optical coherence tomography. Optical spectroscopy is a widely used method to identify the chemical composition of materials and the characteristics of optical signals. Molecular bonds have vibrational modes with resonant frequencies typically in the mid-infrared spectrum ($\sim 3$ μm$\leq \lambda \leq \sim 12$ μm) that can be used to identify the composition of a material by observing its absorption as a function of wavelength. Because of the low absorption of optical fibers in the near infrared, optical telecommunication networks operate within the range 830 nm$\leq \lambda \leq$1650 nm. The wavelength spectrum of telecommunication signals provides important information on their qualities, and thus are often analysed with spectroscopic tools, which in the telecommunication field are referred to optical spectrum analyser. The acquisition of an optical spectrum is typically performed by measuring the power contained in a narrow range of wavelength and combining the resulting data into a function describing the power as a function of wavelength. Hence, swept-filters are often used to implement spectrometers. An alternative approach consists in using multiple filters, each with a different central wavelength, or a dispersive filter but in that case an array of photodetectors is required. This can produce fast systems, but this architecture becomes prohibitively expensive in applications requiring sensitive photodetectors operating at long wavelengths, with high resolution, etc. Beyond silica optical fibers for telecommunications, other materials allow the provisioning of optical fibers such as heavy metal fluoride glasses (HMFG), such as those based upon the ZBLAN glass group composed of zirconium, barium, lanthanum, aluminium, and sodium fluorides, and chalcogenide glasses exploiting elements in group 16 of the periodic table, particularly sulfur (S), selenium (Se) and tellurium (Te). Chalcogenide and ZBLAN optical fibers provide near mid-infrared transmission out to $\lambda \sim 5$ μm. Polycrystalline infrared (PIR) optical fibers exploiting ternary alloys such as AgCl:AgBr, provide mid-IR operation over a wide spectral range, 4 μm$\leq \lambda \leq$18 μm. Other optical fibers provide shorter wavelengths from the visible into the near-ultraviolet. Of course, swept optical components can be employed with micro-optics for free-space operation as well as in conjunction with optical fibers.

Another application where swept-filters are used is in imaging through optical coherence tomography (OCT). OCT has found many applications in medicine and health sciences. It has been adopted in medical specialties such as ophthalmology, cardiology, gastroenterology, and dermatology because it enables non-invasive imaging of features down to a few millimeters inside living tissues. Despite its relatively recent adoption by the medical community, OCT has already improved illness diagnostic and treatment. For instance, OCT imaging of arteries has led to the identification of different types of atherosclerotic plaque, which pose different risks, and this has resulted in the development of novel treatment plans. However, widespread use of this technology is limited by its high acquisition and installation cost.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations in the prior art relating to microoptoelectromechanical systems (MOEMS) and more particular to designs for optical microelectromechanical systems (MEMS) based swept wavelength components such as sources, filters, and detectors exploiting such optical elements in conjunction with MEMS micro-motors.

In accordance with an embodiment of the invention there is provided a device comprising:
a substrate;
a first optical waveguide supporting propagation of optical signals within a predetermined wavelength range disposed upon the substrate coupled via a first facet with a first predetermined geometry to a rotatable microoptoelectromechanical system (R-MOEM); and
the R-MOEM comprising:
  a rotor having a periphery, a central mounting, and plurality of rotor poles;
  a plurality of stator poles;
  a second optical waveguide disposed upon the rotor comprising a second facet with a second predetermined geometry around a predetermined portion of the periphery of the rotor and a third facet with a third predetermined geometry disposed towards the center of the rotor; and
  an optical feature coupled to the third facet.

In accordance with an embodiment of the invention there is provided a rotatable microoptoelectromechanical system (R-MOEMS) comprising:
a substrate;
a rotor with a central support;
a plurality of rotor poles disposed in predetermined relationship around the rotor;
a plurality of stator poles disposed in predetermined relationship to the rotor;
a first optical waveguide disposed upon the rotor comprising a first facet along a predetermined portion of the periphery of the rotor and a second facet with a predetermined geometry disposed towards the center of the rotor; and
an optical feature disposed upon the second facet.

In accordance with an embodiment of the invention there is provided a device comprising:
a substrate;
a first optical waveguide supporting propagation of optical signals within a predetermined wavelength range disposed upon the substrate coupled via a first facet with a first predetermined geometry to a first rotatable microoptoelectromechanical system (R-MOEMS);
the first R-MOEMS comprising:
  a rotor having a periphery and a central mounting, and
  a second optical waveguide disposed upon the rotor comprising a second facet with a second predetermined geometry around a predetermined portion of the periphery of the rotor and a third facet with a third predetermined geometry disposed towards the center of the rotor; and
  an optical feature coupled to the third facet; and
a second R-MOEMS comprising:
  a rotor having a periphery, a central mounting, and plurality of rotor poles;
  a plurality of stator poles; wherein
rotational motion of the second R-MOEMS under electrical control results in rotational motion of the first R-MOEMS.

In accordance with an embodiment of the invention there is a substrate; a rotor with a central support;
an optical waveguide disposed upon the rotor comprising a first facet along a predetermined portion of the periphery of the rotor and a second facet with a predetermined geometry disposed towards the center of the rotor; and
an optical feature disposed upon the second facet.

In accordance with an embodiment of the invention there is provided a microelectromechanical system (MEMS) comprising:
a central spindle;
a rotor having a central portion disposed around the spindle and a plurality N arms radially extending from the central portion to a predetermined distance from centre of the spindle;
a plurality N stators disposed at predetermined locations around the periphery of the rotor such that a predetermined gap exists between the outer edge of the plurality N arms and an inner facing edge of each of the plurality N stators;
a plurality of M supports on the surface of the rotor facing a substrate upon which the MEMS is formed extending from the surface of the rotor by a predetermined distance which support the rotor;
a plurality N top electrodes elements disposed at predetermined locations relative to the plurality N stators extending from a predetermined location beyond the periphery of the rotor to a predetermined distance from the centre of the spindle; wherein
each top electrode is separated from the other surface of the rotor to that having the supports by a predetermined distance.

In accordance with an embodiment of the invention there is provided a method of levitating a rotor of a microelectromechanical system (MEMS) by disposing an electrode at a predetermined separation from the rotor and biasing the electrode relative to the rotor with a potential sufficient to generate an electrostatic attractive force to overcome the force on the rotor due to its mass.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 12A depicts schematically a fabrication issue wherein the rotor is blocked by the top electrode due to conformal deposition;

FIG. 12B depicts schematically a top view of a design layout according to an embodiment of the invention removing the fabrication issue presented in FIG. 12A;

DETAILED DESCRIPTION

Figure 1A:
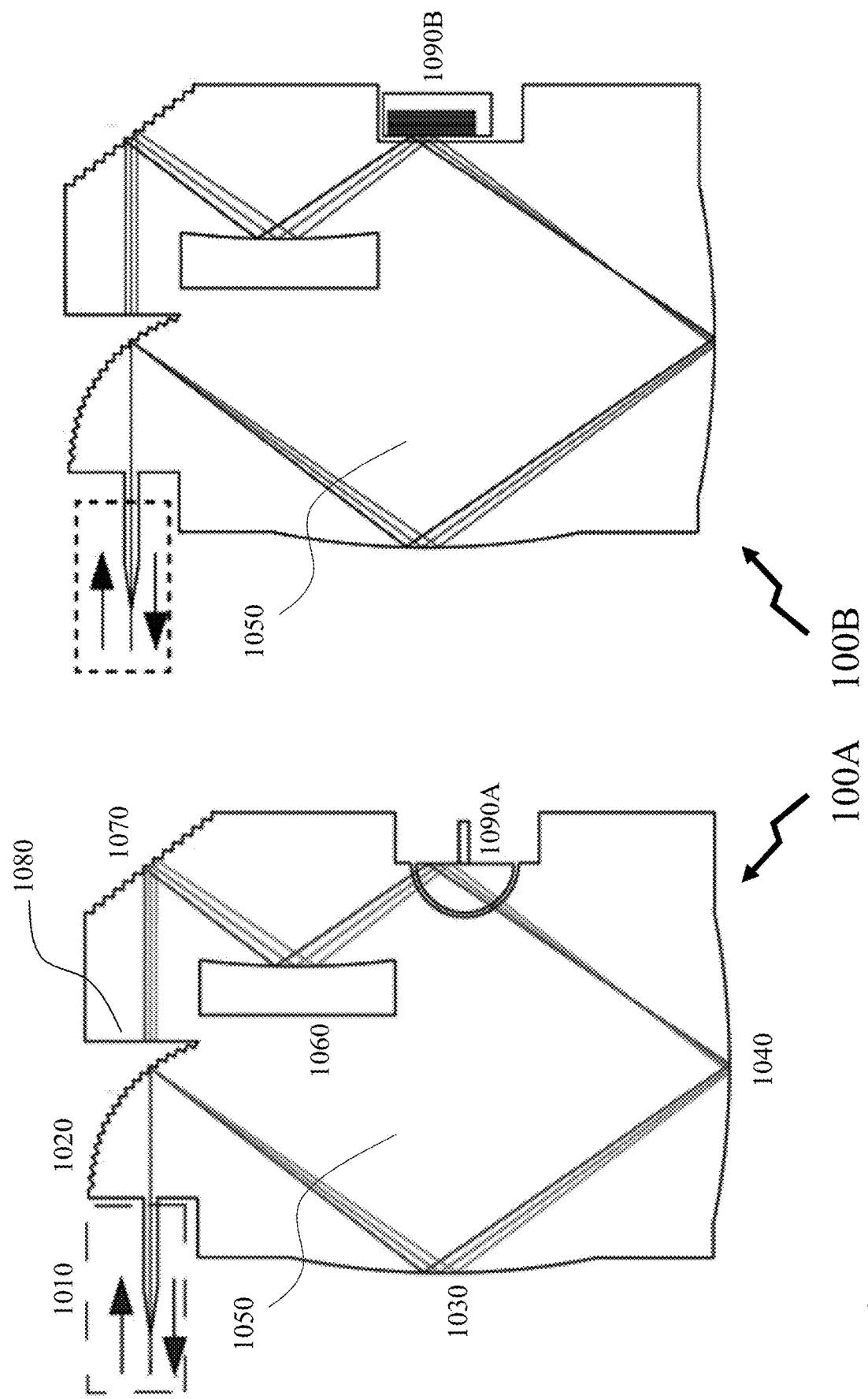
FIGS. 1A and 1B depict schematics of MOEMS based tunable optical elements as known within the prior art for optical coherence tomography (OCT), tunable WDM sources/filters/receivers.

The present invention is directed to microoptoelectromechanical systems (MOEMS) and more particular to designs for optical microelectromechanical systems (MEMS) based swept wavelength components such as sources, filters, and detectors exploiting such optical elements in conjunction with MEMS micro-motors.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments. It would also be evident that an embodiment may refer to a method or methods of manufacturing a device rather than the actual design of a device and that vice-versa an embodiment of the invention may refer to a device or devices rather than the method or methods of manufacturing.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, method, or characteristic "may", "might", "can" or "could" be included, that particular component, feature, structure, or characteristic is not required to be included. It would also be evident that an embodiment and/or the phraseology and/or terminology may refer to a method or methods of manufacturing a device rather than the actual design of a device and that vice-versa an embodiment and/or the phraseology and/or terminology may refer to a device or devices rather than the method or methods of manufacturing.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, methods, components or groups thereof do not materially alter the basic and novel characteristics of the claimed composition, device or method. If the specification or claims refer to "an additional" element, that does not preclude there being more than one of the additional element or method.

An "optical waveguide" as used herein, and throughout this disclosure, refers to a structure that confines electromagnetic radiation within a predetermined wavelength range. This includes, but is not limited, to the visible wavelength range (typically defined as 400 nm≤λ≤700 nm) and near infra-red (IR) (700 nm≤λ≤1650 nm) including telecommunication bands such as O-band (1260 nm≤λ≤1360 nm), S-band (1460 nm≤λ≤1530 nm), C-band (1530 nm≤λ≤1565 nm), and L-band (1565 nm≤λ≤1625 nm). However, optical waveguides may also support guiding of optical signals within the near ultra-violet (UV), far UV, mid-IR, and far IR according to the waveguide materials, waveguide design etc.

A "channel" waveguide as used herein, and throughout this disclosure, refers to a three-dimensional (3D) waveguide that confines the optical radiation (optical signal) laterally, vertically and directs the propagation within the waveguide.

A "slab" or "planar" waveguide as used herein, and throughout this disclosure, refers to a two-dimensional (2D) waveguide that confines the optical radiation (optical signal) vertically but not within the lateral or forward propagating directions.

A "passive" waveguide as used herein, and throughout this disclosure, refers to section of an optical waveguide or an optical waveguide having material characteristics that vary according to the intrinsic properties of the material from which the passive waveguide is formed.

An "active" waveguide as used herein, and throughout this disclosure, refers to a section of an optical waveguide or an optical waveguide supporting modification of an optical characteristic through the application of an electrical current or voltage in addition to intrinsic variations such as refractive index with temperature. Electrical current or voltage being applied via a semiconductor junction, p-n junction, p-i-n junction, a quantum structure, and a quantum dot for example. Such structures can comprise single or multiple quantum structures and junctions to generate single or multiple wavelengths and combinations thereof.

A "compound semiconductor" or "semiconductor" as used herein, and throughout this disclosure, refers to a material having an electrical conductivity value falling between that of a conductor and an insulator wherein the material may be an elemental material or a compound material. A semiconductor may include, but not be limited to, an element, a binary alloy, a tertiary alloy, and a quaternary alloy. Structures form from a semiconductor or semiconductors may comprise a single semiconductor material, two or more semiconductor materials, a semiconductor alloy of a single composition, a semiconductor alloy of two or more discrete compositions, and a semiconductor alloy graded from a first semiconductor alloy to a second semiconductor alloy. A semiconductor may be undoped (intrinsic), p-type doped, n-typed doped, graded in doping from a first doping level of one type to second doping level of the same type, or grading in doping from a first doping level of one type to a second doping level of a different type. Semiconductors may include, but are not limited to:

Elements, such as certain group IV and group VI elements, e.g. silicon (Si) and germanium (Ge), and binary group IV alloys, e.g. silicon germanium (SiGe) and silicon carbide (SiC);

III-V semiconductors, such as those between aluminum (Al), gallium (Ga), and indium (In) with nitrogen (N), phosphorous (P), arsenic (As) and tin (Sb), including for example GaN, GaP, GaAs, InP, InAs, AlN and AlAs; and Organic semiconductors, which may include single molecules oligomers, organic polymers, and polycyclic aromatic hydrocarbons.

A "semiconductor optical emitter" (SOE) as used herein, and throughout this disclosure, refers to an electrically pumped semiconductor device in which the active optically emitting medium is formed by a p-n junction of a semiconductor diode. If the semiconductor optical emitter is formed within a cavity having low optical reflectivity the SOE will providing optical gain (amplification) providing a "semiconductor optical amplifier" (SOA). If formed within a cavity having high reflectivity, then the SOE will provide optical gain for spontaneous emission from the SOE within the wavelength range defined by the characteristics of the SOE and the high reflectivity facets thereby forming a laser diode.

An "external cavity diode laser" (commonly referred to as an ECL) employs a SOE operating as a semiconductor optical amplifier (SOA) with a first high reflectivity facet and a second high reflectivity facet formed from a tunable wavelength component such as a micro-motor based MOEMS swept filter.

MEMS within the prior art have primarily been employed to process optical signals through free-space optics or through their direct coupling to optical fibers. Thus, they cannot combine MEMS functionality with optical components in a single compact device, chip or die. To our knowledge, monolithic integration of optical waveguides and MEMS has been restricted to either:

moving a small waveguide section which offers limited processing capabilities;

exploiting modest changes in refractive index obtained with a MEMS membrane; and commutation with a MEMS actuated waveguides.

A: Microoptoelectromechanical Systems

Figure 1B:
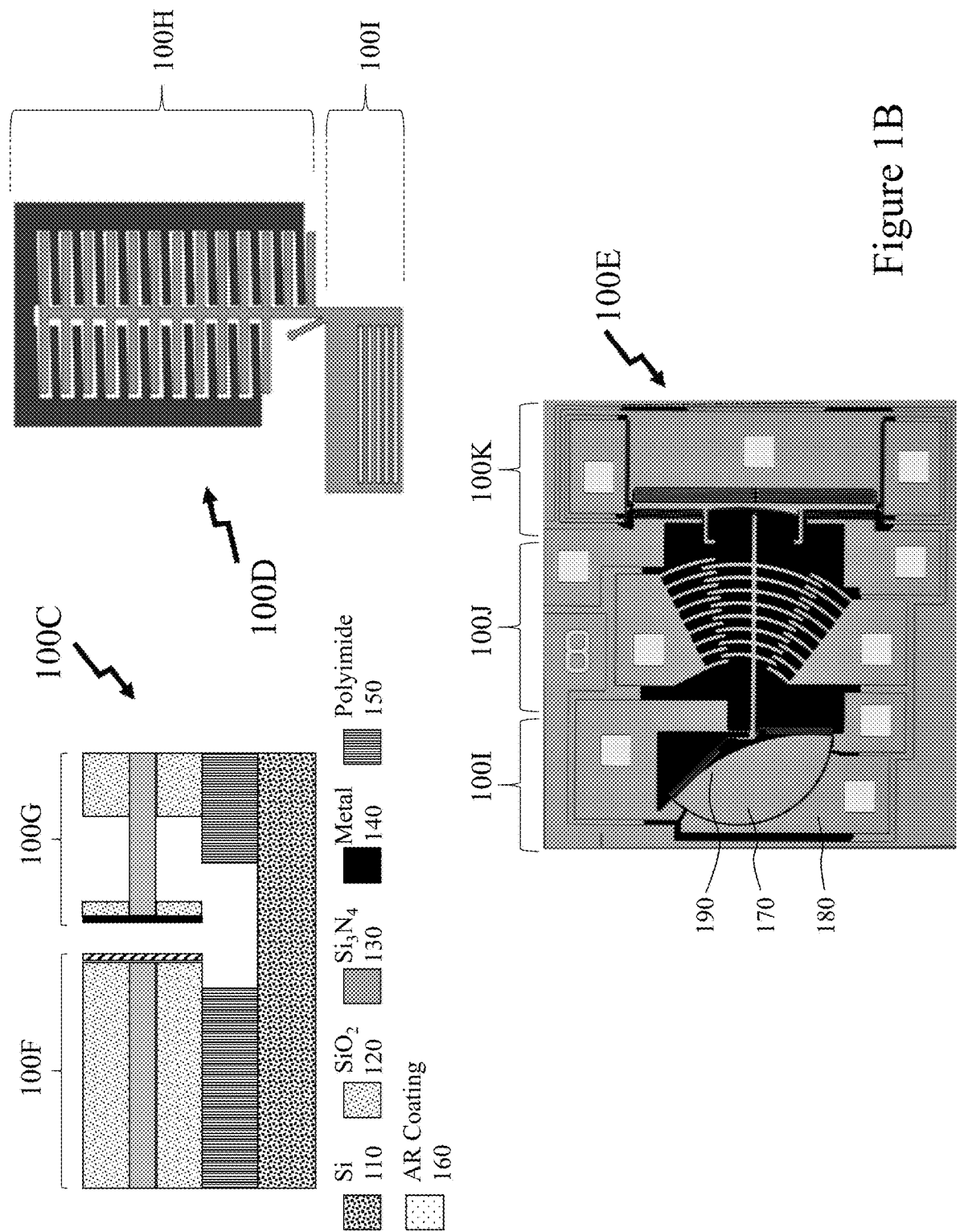

Referring to FIGS. 1A and 1B there are depicted first to fifth schematics 100A to 100E of MOEMS based tunable optical elements established by the inventors within the prior art for optical coherence tomography (OCT), tunable WDM sources/filters/receivers, etc. within planar waveguide embodiments. Other tunable components exploiting MEMS exist within the prior art such as MEMS Fabry-Perot tunable filters, MEMS tilted gratings etc. exploiting free space optical designs.

First schematic 100A depicts a schematic representation of the integrated MOEMS OCT design exploiting a rotating MEMS mirror 1090A to fit within an area of approximately 12 mm×8 mm. Light from a broadband source is coupled to the planar waveguide 1050 that forms the delay line of the OCT via a ridge waveguide 1010. The beam then propagates into the planar waveguide 1050 where in it reflects off all the gratings and mirrors encountered. First and second echelle gratings 1020 and 1070 respectively provide the required wavelength dispersion such that the incident optical signal to the device is split into several paths according to wavelength. The first to third mirrors 1030, 1040, and 1060 respectively are used to enlarge the path difference taken by the different wavelengths, that path difference between different wavelengths generates the time delay. The first to third mirrors 1030, 1040, and 1060 respectively are curved to allow the refocusing of the optical signals, and to prevent the beams from leaving the system even with different tilt angles of the rotating MEMS mirror 1090A. The fourth mirror 1080 is perpendicular to the incident optical signals to retro-reflect them such that they re-traverse the optical path back to the ridge waveguide 1010. All these reflecting surfaces, first to fourth mirrors 1030, 1040, 1060, and 1080 are obtained by a simple etch step of the planar waveguide.

The other reflecting element is rotating MEMS mirror 1090A which provided for tunability of the delay induced by the device. As evident in first schematic 100A in FIG. 1A the rotating MEMS mirror 1090A supports propagation of the optical signals to/from the planar waveguide via a circular interface such that as the rotating MEMS mirror 1090A rotates the optical coupling is unaffected and it is only the incident/reflected angles from the rear facet of the rotating MEMS mirror 1090A that adjust. In contrast in second schematic 100B the rotating MEMS mirror 1090A is replaced by MEMS Bragg mirror 1090B which provides for tunability of the delay induced by the device. The MEMS Bragg mirror 1090B within an embodiment of the invention and as depicted in second schematic 100B consists of 5 and ½ pairs of silicon/air interfaces, with a 7.8 µm thickness, 300 µm long, and 12.46 µm wide. The MEMS Bragg mirror 1090B is released from the substrate by removing a sacrificial layer, e.g. polyimide or 21 µm thick $SiO_2$ layer under the MEMS Bragg mirror 1090B, leaving a fixed anchor that is connected to an immovable part of the substrate. Optionally, the MEMS Bragg mirror 1090B may be a simple reflector.

Referring to third schematic 100C an optical waveguide—MEMS interface comprising an optical waveguide portion 100E and MEMS reflector 100F is depicted. As depicted the MEMS reflector 100F exploits the same material stack as the optical waveguide 100E, namely upper and lower claddings of silicon dioxide ($SiO_2$) 120 with a core of silicon nitride ($Si_3N_4$) 130 formed atop a sacrificial polyimide layer 150 atop a silicon 110 substrate. The oppositely disposed facets of the waveguide portion 100F and MEMS reflector 100G are coated with anti-reflection (AR) coating 160 and metal 140. As depicted in fourth schematic 100D the MEMS reflector 100G may comprise a mirror element 100I connected to a linear MEMS actuator 100H.

Accordingly, mirror element 100I is equivalent to mirror 1090B in second schematic 100B whilst waveguide portion 100F is planar waveguide 1050 in second schematic 100B although in other embodiments of the invention one or more channel (three-dimensional, 3D) waveguides may be employed in conjunction with a MEMS activated reflector, e.g. mirror or diffraction grating (e.g. planar waveguide echelle for swept devices or array waveguide gratings (AWGs) for DWDM).

Now referring to fifth schematic 100E there is depicted a rotating MEMS mirror established by the inventors comprising a circular section mirror 100I coupled to a MEMS actuator 100J and latching actuator 100K. The circular section mirror 100I pivots about an anchor point at is centre under action of the MEMS actuator 100J. The circular section mirror 100I comprising a MEMS element 170 rotating relative to a circular faceted waveguide 180. Such a rotating MEMS mirror providing enhanced rotation of a circular mirror formed within an OCT such as presented by the inventors, see for example PCT patent application WO/2015/131271 entitled "Mirror Based Microelectromechanical Systems and Methods" published Sep. 11, 2015. Whilst the MEMS element 170 employs a circular concave rear reflector facet 190 which focuses the reflected signals at a predetermined point the rotating MEMS mirror 1090A in first schematic 100A employs a planar reflective facet. Accordingly, it would be evident that different reflector designs may be employed from a planar facet that merely reflects to concave reflector focusing the incident optical signals and scanning or to convex to scan but with magnification of scanned region/divergent optical signals. Whilst the ensuing embodiments of the invention have been described with respect to polygonal planar facets it would be evident that other facet geometries may be employed.

B: Rotor Based Microoptoelectromechanical Systems

Figure 2A:
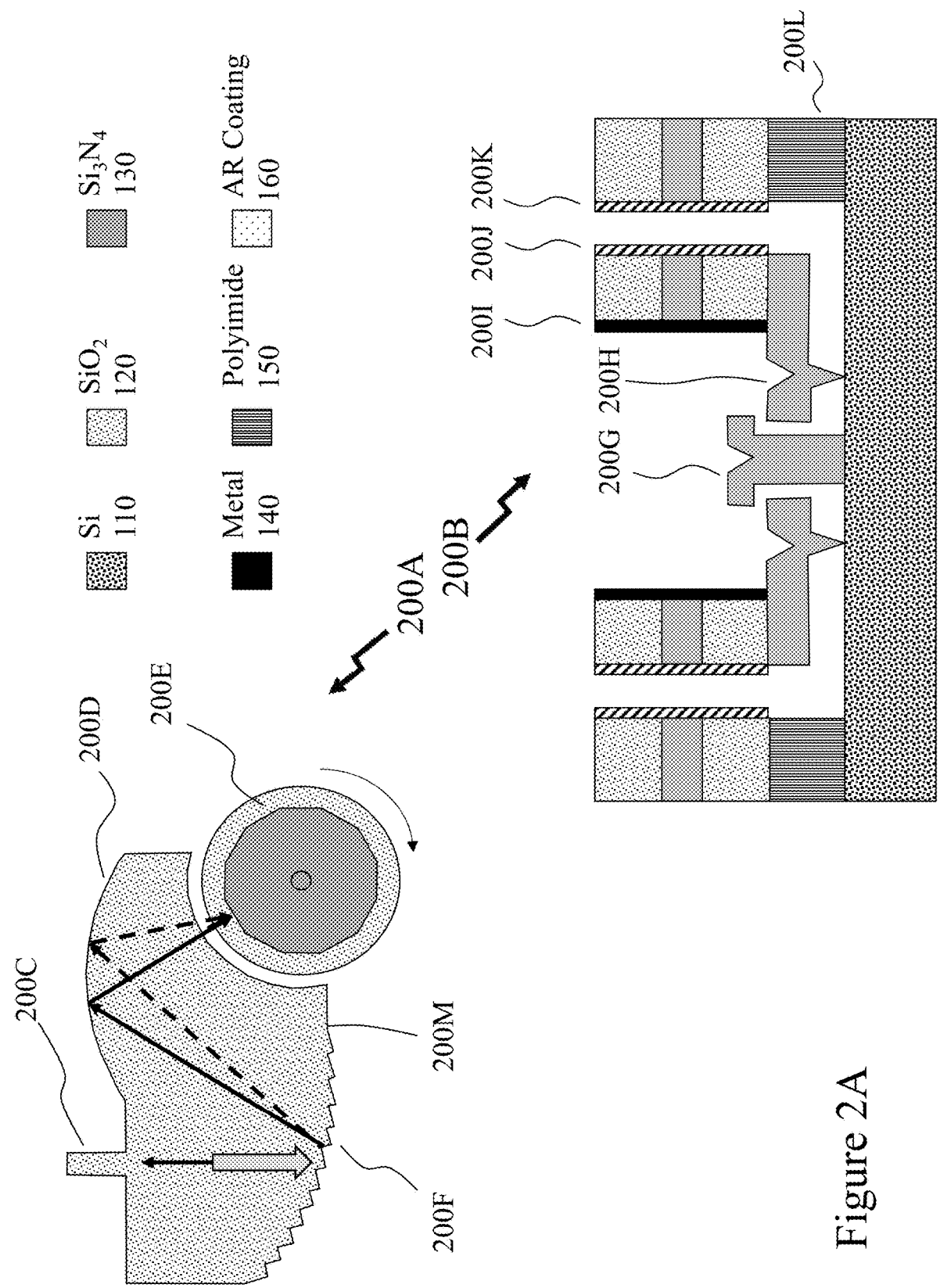
FIG. 2A depicts a MOEMS swept optical element exploiting a micro-motor based mirror according to an embodiment of the invention.

Now referring to FIG. 2A there is depicted a MOEMS swept optical element exploiting a micro-motor based mirror according to an embodiment of the invention as depicted in plan view 200A and cross-section 200B exploiting planar optical waveguides as part of and external to the micro-motor. Whilst the MEMS based mirrors within first and second schematics 100A and 100B respectively in FIG. 1 may form part of a range of MOEMS the configuration depicted in third schematic 100C is a time domain based OCT. In contrast the MOEMS swept optical element in FIG. 2A may form part of a Fourier-domain OCT systems using a swept-source. This configuration is currently used in state-of-the-art OCT systems and can achieve much faster scan rates than time-domain systems while providing an improvement in signal-to-noise ratio. Within Fourier-domain OCT, the interference information is measured as a function of wavelength and this interference information is then Fourier transformed to generate the OCT image. However, the implementation of efficient narrow band swept-sources is challenging, and thus, these Fourier-domain OCT systems are more expensive than their time-domain counterparts.

Considering the design depicted in first and second schematics 200A and 200B in FIG. 2A then the wavelength-swept device an integrated waveguide implementation of a free-space polygon-scanner filter. Within a Fourier-domain OCT instead of being located in the reference arm of the interferometer, the wavelength-swept device is part of the optical cavity of the narrow band swept-source. As depicted in first schematic 200A the wavelength scanning system comprises an echelle grating 200F, a concave focusing mirror 200D and a rotating scanning polygon micro-mirror 200E with multiple reflective facets wherein the optical signals propagate to/from an optical port 200C via a slab waveguide 200M. The polygon is inscribed inside a cylinder to keep a constant and small air gap between the moving structure and the planar waveguide 200M. As the polygon, formed upon the rotor 200H which is released by the etching of the polyimide layer 200L, rotates around its spindle 200G, its inner perimeter reflects back, via mirror 200I, only a narrow band of wavelengths along the path that routes from the port 200C, indicated by arrows, whose central wavelength changes continuously wherein the reflected light is dispersed again by the grating before being recoupled to the input waveguide. The interfaces 200J and 200K being anti-reflection coated. When integrated with an optical gain medium, such as an SOA for example, this continuous sweep implements the swept source. The polygon-scanner actuation relies on a MEMS micro-motor device under the polygon. Within the following description embodiments of the invention for realizing this micro-motor are presented and discussed, based upon a mix of surface and bulk micromachining Whilst MEMS micro-motors have been reported within the prior art, with some achieving 500,000 rpm, the embodiments of the invention are to the inventor's knowledge their first integration within a guided-wave optical system, and enable much faster swept source with linear wavelength scans.

Figure 2B:
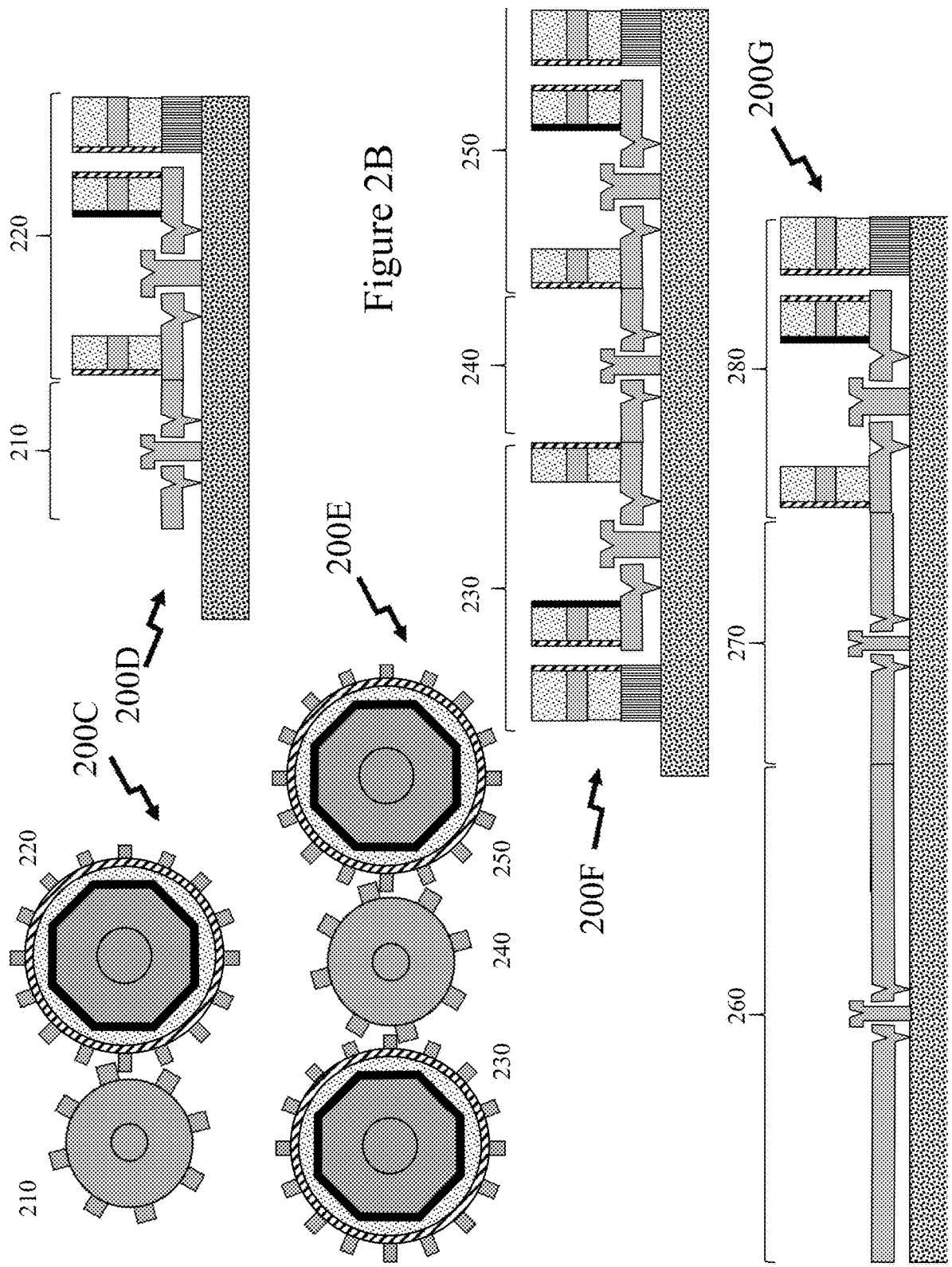
FIG. 2B depicts MOEMS swept optical elements exploiting a micro-motor coupled to rotating MOEMS directly or via gears according to an embodiment of the invention via MEMS gears.

Within the embodiments of the invention depicted and described in respect of FIG. 2A and FIGS. 3 to 9 the designs depicted and described are what the inventors refer to as direct drive micro-motors wherein the rotor within the micro-motor directly supports the rotating optical element, e.g. a polygonal mirror. However, it would be evident that the micro-motor may alternatively be coupled to one or more rotating optical elements directly or by one or more gears such as depicted in respect of FIG. 2B. Accordingly, there are depicted:

First schematic 200C representing a plan view of a MOEMS 220 driven by a MEMS micro-motor 210;

Second schematic 200D representing a cross-section of first schematic 200C with the MOEMS 220 driven by a MEMS micro-motor 210;

Third schematic 200E representing a plan view of first and second MOEMS 230 and 250 respectively driven by a MEMS micro-motor 240;

Fourth schematic 200F representing a cross-section of third schematic 200E with the first and second MOEMS 230 and 250 respectively driven by a MEMS micro-motor 240; and Fifth schematic 200G representing a cross-section of a MOEMS 280 coupled to a MEMS micro-motor 260 via an intermediate gear 270.

Accordingly, it would be evident that multiple MOEMS may be driven from a single MEMS micro-motor, a single MOEMS may be driven by an active MEMS micro-motor if a set of MEMS micro-motors coupled to the MOEMS, or that one or more MOEMS may be coupled to one or more MEMS micro-motor via one or more gears according to the design requirements of the system within which the MOEMS scanning optical components are employed. For example, a single MOEMS may be rapidly scanned across a first wavelength range at high speed for monitoring but then driven at slower speed with higher resolution through one or more predetermined wavelength bands based upon the detection of a feature with the high speed monitoring. Whilst the embodiments of the invention are presented with respect to micro-motors that rotate continuously and freely without contact to other elements it would be evident that other designs may be employed including ratcheted micro-motors supporting discrete stepped rotation.

Referring to FIGS. 3 to 6 respectively there is depicted an exemplary process flow for a micro-motor based MOEMS swept optical element according to an embodiment of the invention. It would be evident to one of skill in the art that the micro-motors according to embodiments of the invention may be realized using a range of fabrication approaches exploiting both surface and/or bulk micromachining methodologies. The process flow depicted in FIGS. 3 to 6 employs a silicon-on-insulator (SOI) substrate. Accordingly, the process begins with a substrate as depicted in first image set 300A in FIG. 3. Within each image set a plan view together with first and second cross-sections along lines A-A and B-B are depicted. The SOI substrate comprising a layer of silicon (Si) 310 atop an insulator, silicon dioxide ($SiO_2$) 320 atop a substrate 305 which may similarly be silicon but may be another material compatible with the manufacturing and deployment requirements of the SOI.

Figure 3:
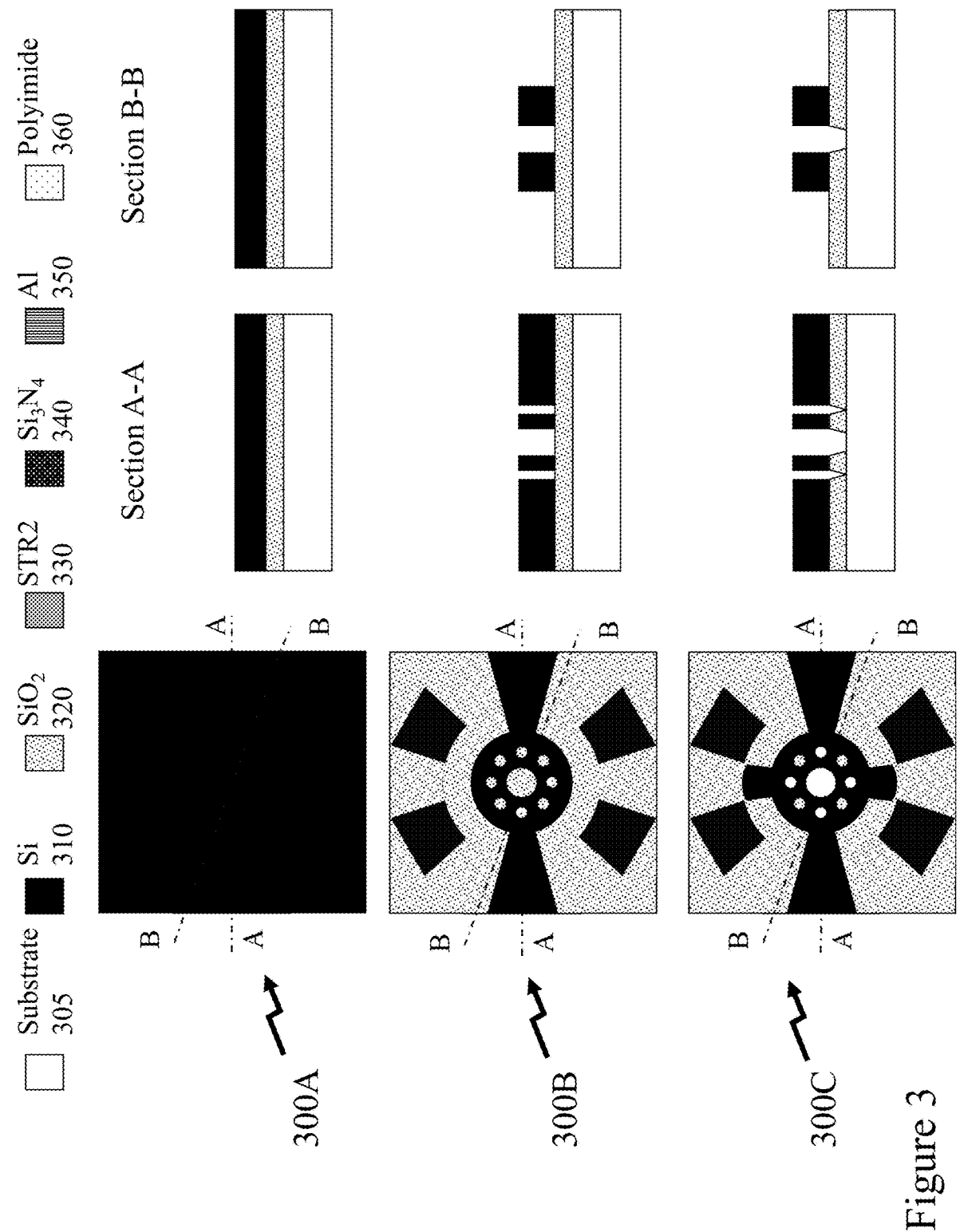
FIGS. 3 to 6 depict an exemplary process flow for a micro-motor based MOEMS swept optical element according to an embodiment of the invention.

In second step 300B in FIG. 3 the Si 310 device layer is patterned in order to form the outline of the motor rotor and its driving electrodes. At the same time, holes within the Si 310 device layer are patterned within the motor rotor including a central hole for the micro-motor bearing together with holes for what will become what the inventors refer to as "dimples" as well as release holes for the release step of the MEMS micro-motor are formed. As depicted, in step 300B and subsequent images relating to subsequent steps there are four holes for "dimples" set at θ=0°, 90°, 180°, 270° and four holes for releasing the rotor set at θ=45°, 135°, 225°, 315°. It would evident that the number of holes for "dimples" and release may be varied as may their positions relative to the rotor, the bearing hole, etc. according to design requirements, processing requirements, material factors, etc. either discretely, in combination, or in combination with other aspects of the design such as number of electrodes etc. as evident from first and second SEM micrographs 900 and 950 in FIG. 9 that depict micro-motors with 6 and 12 electrodes respectively as well as a single ring and triple rings of holes respectively. The "dimples" allow the rotor to move freely with minimum friction after release without collapsing or sticking to the substrate.

In third step 300C in FIG. 3 the buried insulator, $SiO_2$ 320, is patterned and removed from the dimple holes and bearing hole. As depicted the holes at θ=0°, 90°, 180°, 270° are cleared for subsequent formation of the dimples.

Figure 4:
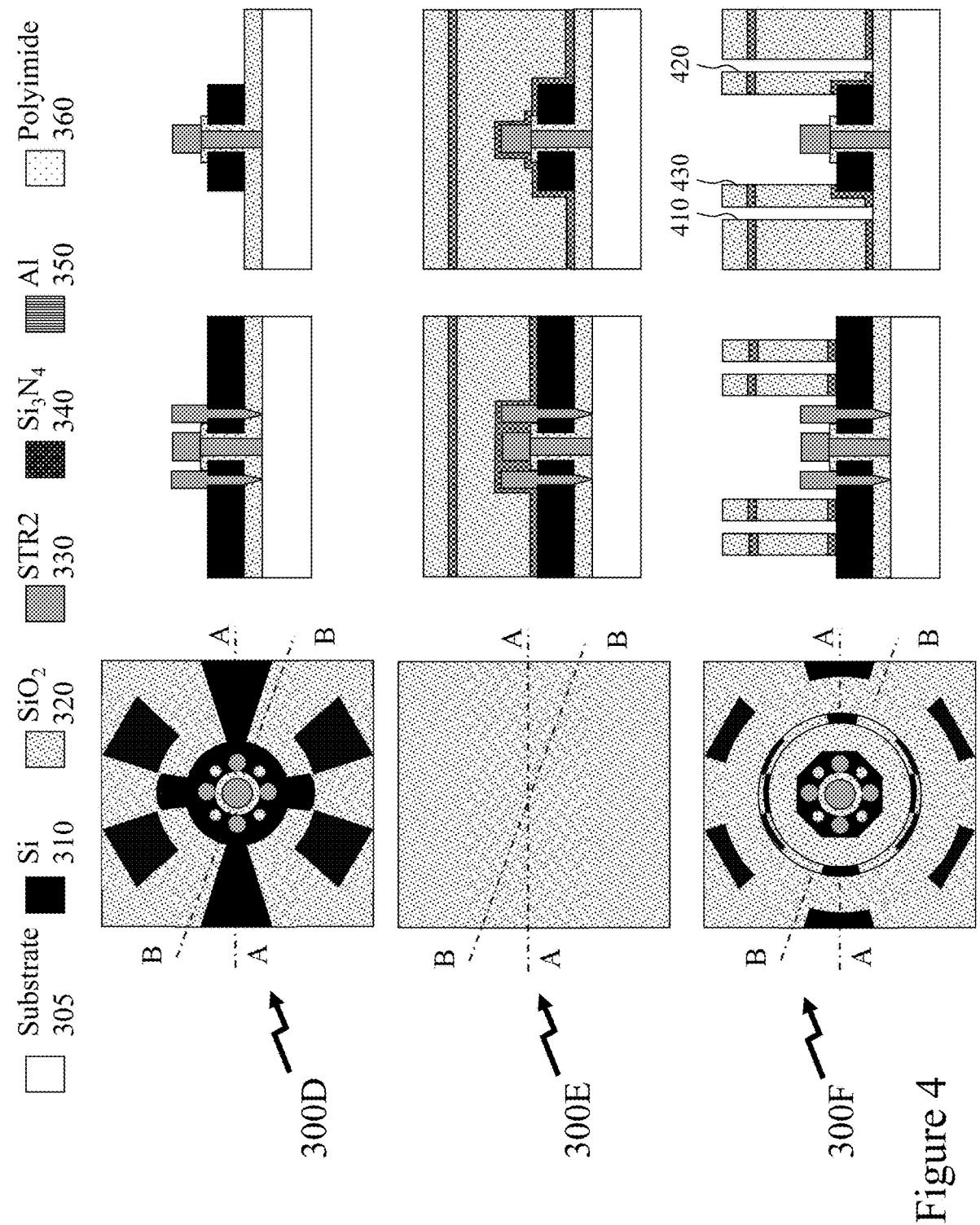

In fourth step 300D in FIG. 4 a layer of $SiO_2$ 320 is deposited and patterned to form the bearing gap. This is followed by the deposition and patterning of a second structural layer (STR2 330) to form the bearing and dimples. This STR2 330 may be formed from a variety of materials including, but not limited to, poly-silicon (poly-Si), silicon nitride ($Si_3N_4$), silicon oxynitride ($SiO_xN_y$), silicon carbide (SIC), graphite (C), aluminum oxide ($Al_2O_3$), or metals either discretely or in combination.

In fifth step 300E in FIG. 4 a layer of silicon nitride ($Si_3N_4$) 340 is deposited in order to form an etch stop layer to protect the optical waveguide stack during the final release step. Then, this optical waveguide stack is formed by depositing a layer of $SiO_2$ 320, polishing this to form the bottom cladding of the optical waveguide, and then depositing the $Si_3N_4$ 340 core and $SiO_2$ 320 upper cladding layers. $SiO_2$ 320 and $Si_3N_4$ 340 are described within this embodiment of the invention for the optical waveguide but it would be evident that the optical waveguide material may be varied according to the optical wavelength range of the swept optical component and that such optical waveguides may include, but not be limited to, those exploiting Doped $SiO_2$ 320 core (e.g. Ge-doped) with $SiO_2$ 320 cladding;
Si core with $Si_3N_4$ lower cladding and air or $Si_3N_4$ upper cladding;
SiC core with $Si_3N_4$ or $SiO_2$ upper and lower claddings;
$Si_3N_4$ core with $SiO_2$ lower cladding and polymer, e.g. PMMA, poly(glycidyl methacrylate) (PGMA);
GaAs based semiconductor materials;
InGaAsP based semiconductor materials; and
Chalcogenide glass based waveguides, e.g. $As_2S3$.

In sixth step 300F in FIG. 4 the optical waveguide stack is patterned in order to form the optical facets, namely:
the facet of the optical waveguide (channel or slab) facing the micro-mirror, first facet 410;
the fact of the optical waveguide upon the micro-motor facing the optical waveguide(s) adjacent, second facet 420; and
the facet on the inner surface etched region which will be metallized to form the mirror, third facet 430.

The optical waveguide stack is also removed from atop the electrical interconnection pad regions. It would be evident to one of skill in the art that these pads and their associated electrical interconnects can be routed so as not to alter the optical operation of the device (allowing for large light input angles). Within FIGS. 3 to 6 respectively the electrode pads are drawn concentrically in order to simplify the process flow schematics.

Figure 5:
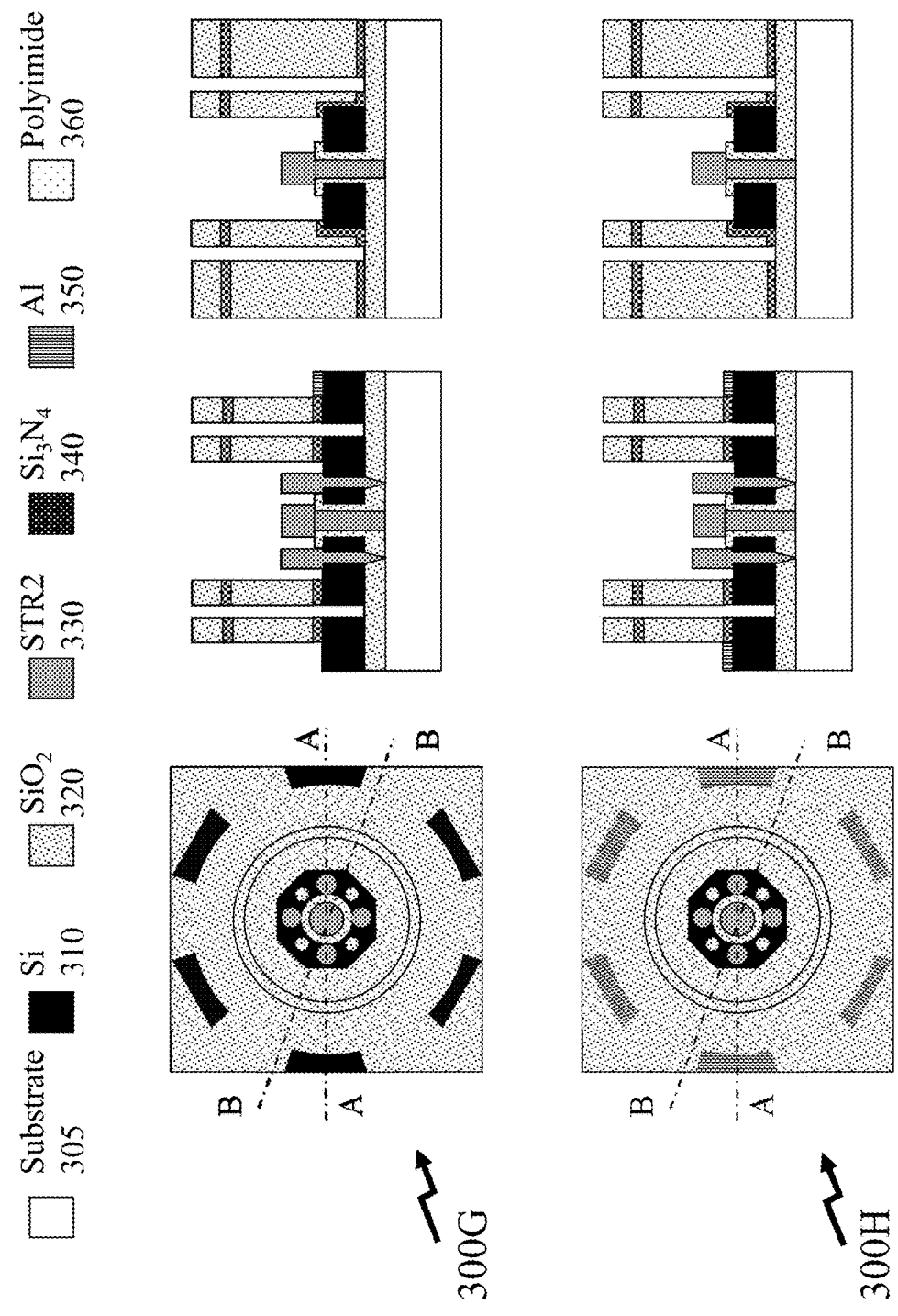

In seventh step 300G in FIG. 5 the Si 310 device layer is patterned, being masked by the optical stack in the optical gap region to form the same gap for electrostatic transduction. A photoresist masking layer is used in other regions, e.g., central polygon part.

In eighth step 300H in FIG. 5 an aluminum layer is deposited and patterned to form the pads atop the Si 310 device layer.

Figure 6:
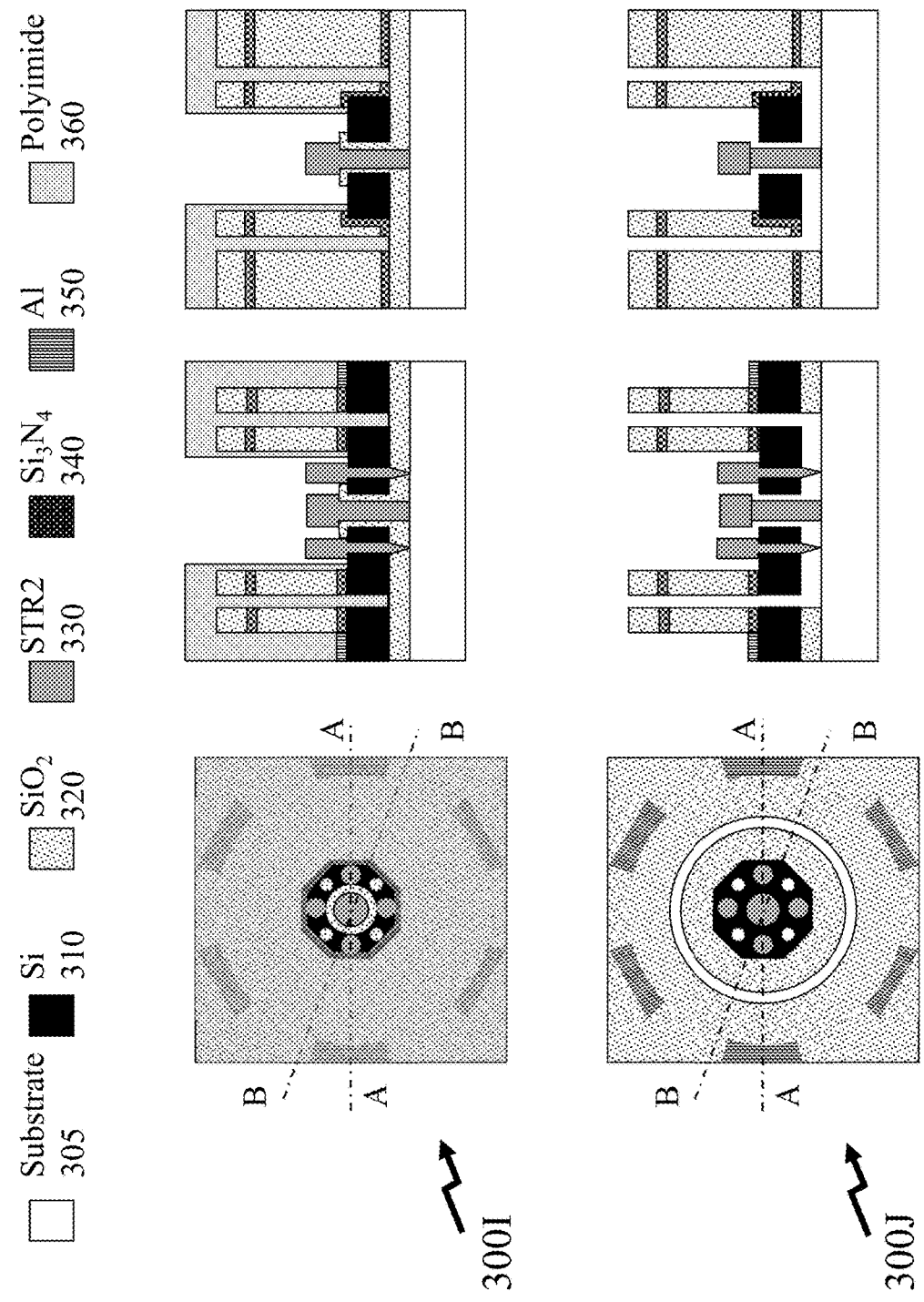

In ninth step 300I in FIG. 6 a polyimide layer is deposited and patterned, in order to act as a protection layer for the optical stack and the aluminum interconnects during the final release step. Within this process flow polyimide is employed although it would be evident that other materials may be employed to protect these regions of the swept optical component. Such materials may include, for example, parylene and photoresist (e.g. SU8).

In tenth step 300J in FIG. 6 the structure is finally released through the removal of the sacrificial layer, $SiO_2$ 320, using hydrofluoric acid (in vapor form or liquid followed by critical point drying), followed by the removal of the polyimide 360 using an oxygen plasma. It would be evident that other materials may be employed as the sacrificial layer according to the selection of the structural layer. For example, whilst $SiO_2$ 320 is commonly employed with poly-Si and tungsten structural layers poly-Si itself may be employed as the sacrificial layer in conjunction with $Si_3N_4$. In other embodiments of the invention multiple sacrificial layers may be employed according to the design and complexity of the processing for the micro-motor MOEMS discretely or in combination with other optical, electrical, and MEMS elements.

It is worth noting that the rotor electrical connection to the substrate ground plane is maintained during rotation through the dimples and bearing.

Figure 7:
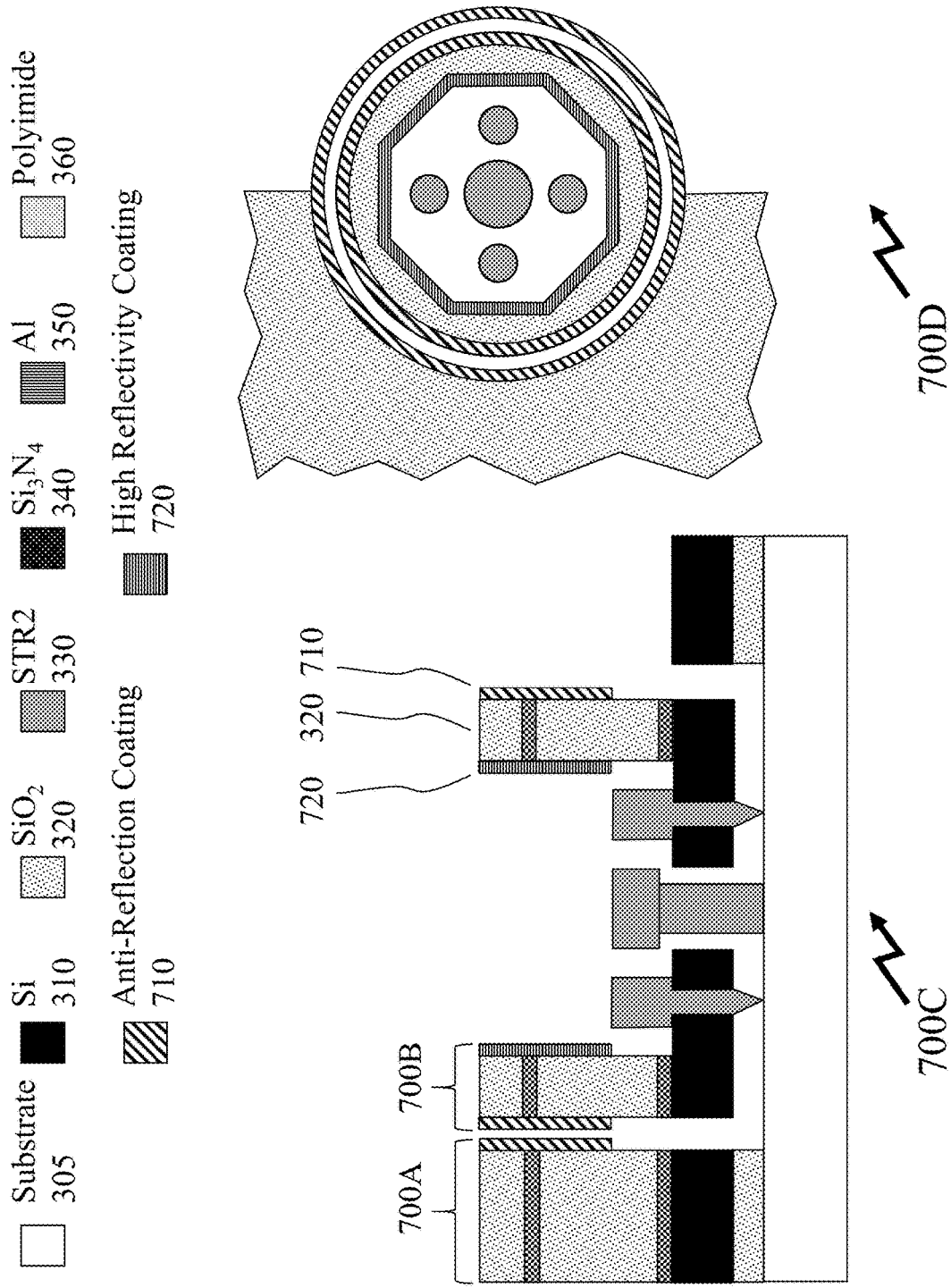
FIG. 7 depicts an exemplary micro-motor based MOEMS denoting the optical interfaces according to an embodiment of the invention.
Figure 8:
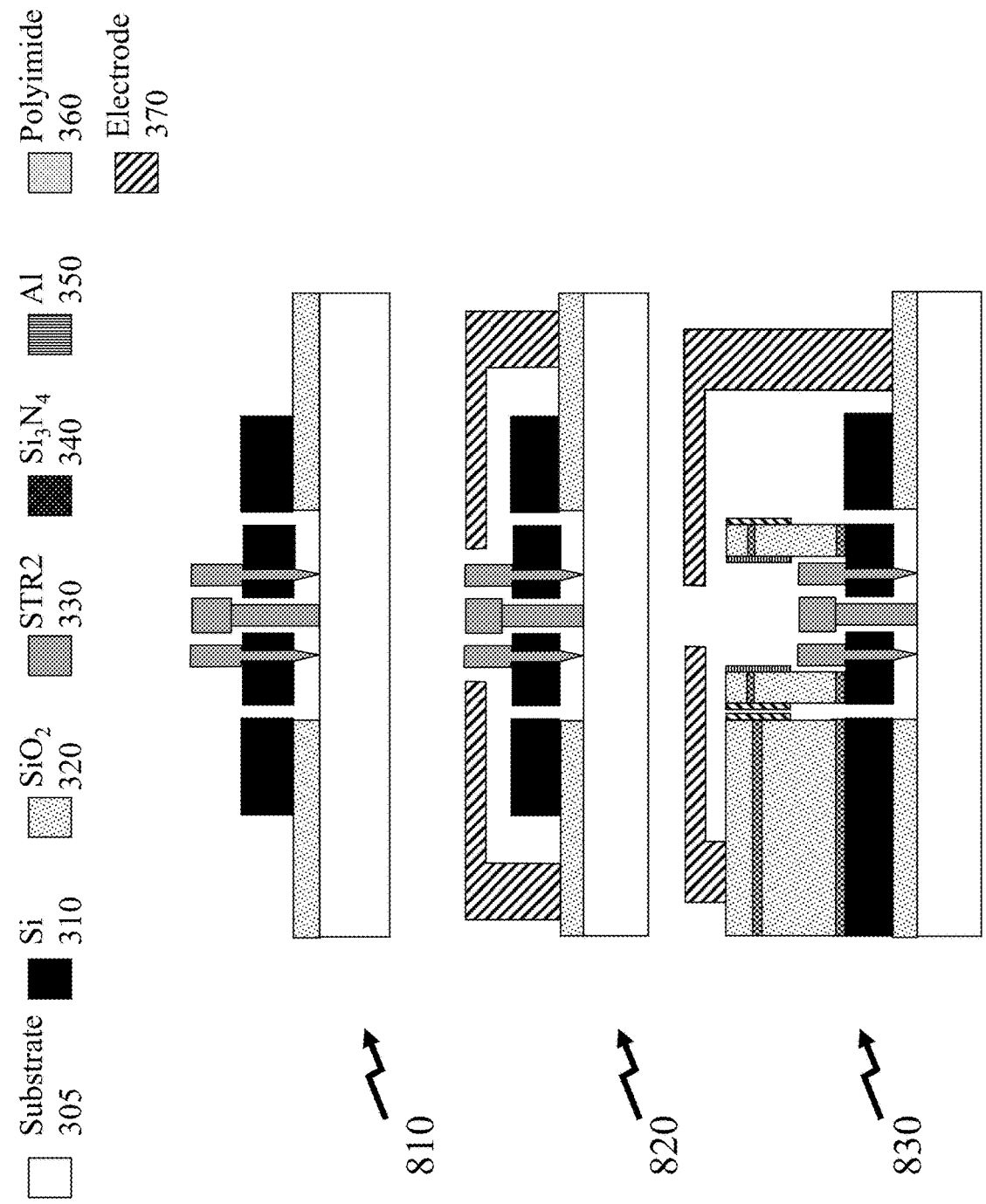
FIG. 8 depicts micro-motor based MOEMS swept optical elements with and without electrostatic levitation according to embodiments of the invention.

Now referring to FIG. 7 there is depicted a cross-sectional schematic 700C and plan view 700D of a micro-motor MOEMS according to an embodiment of the invention with the additional provisioning of anti-reflection (AR) coating 710 and high reflectivity (HR) coating 720. Referring initially back to FIG. 2A a micro-motor MOEMS was depicted coupled to an optical waveguide structure. As depicted in FIG. 7 in cross-sectional schematic 700C the optical waveguide structure depicted as comprising fixed portion 700A and micro-motor portion 700B. Within the Fourier-transform OCT of FIG. 2A the fixed portion 700A is the slab waveguide. As the micro-motor rotates continuously then the micro-motor portion 700B is around the full periphery of the micro-motor rotor. The facets of the fixed portion 700A and micro-motor portion 700B that face each other are coated with AR coating 710 whilst the inner surface of the polygonal opening within the rotor is coated with the HR coating 720. This is evident in plan view 700D wherein the outer periphery of the optical waveguide upon the rotor, micro-motor portion 700B, and the facet of the slab waveguide, fixed portion 700A, are both circular with common center of radius such that as the rotor rotates the optical interface is the same. However, once the optical signal(s) are coupled into the micro-motor portion 700B then they impinge the HR coating 720 according to the rotation of the micro-motor rotor. Whilst the embodiments of the invention have been described and depicted with relatively large fixed portions 700A it would be evident that they may be comparable to or small than the micro-motor rotor in their lateral dimension as the optical interface between the fixed portion 700A and the micro-motor portion 700B. Whilst an octagonal opening within the micro-motor portion 700B has been described and depicted in order to form a rotating plane mirror it would be evident that other polygonal geometries may be employed including, but not limited to, triangular, square, pentagonal, hexagonal, etc. In other embodiments a single linear facet may be employed whereas in others a curved geometry may be employed either convex or concave relative to the incident optical signal(s) from the fixed portion 700A. Optionally, the micro-motor portion 700B may be only present where a mirror facet is required in order to reduce unnecessary loading on the micro-motor.

Within the embodiments of the invention described and depicted in respect of FIGS. 2A to 7 the micro-motor MOEMS have been described with respect to continuous mirrors formed on the inner polygonal surfaces of the etched waveguide structure atop the rotor of the micro-motor or a MOEMS coupled to the micro-motor. However, it would be evident that other structures may be employed including, but not limited to, a diffractive element, a Bragg mirror, periodic or aperiodic reflectors, and periodic or aperiodic retro-reflectors.

Within the embodiments of the invention described and depicted in respect of FIGS. 2A to 7 the electrostatic micro-motors have been described as being basically composed of a rotor with a central bearing. The rotor is surrounded by stator electrodes and dimples on the rotor are employed in order to allow the rotor to rotate freely with minimum friction and without stiction to the substrate. Such a cross-section of a simplified basic micro-motor is depicted in first image 810 of FIG. 8. However, the inventors further propose that an additional electrode is employed above the rotor to levitate the rotor and eliminate any friction to the substrate by applying a voltage between this electrode and the rotor. This voltage may be a DC signal or alternatively it may be an AC signal including a high frequency AC signal. This induces an electrostatic force that levitates the rotor from contact with the ground plane (or reduces its contact) to avoid or reduce friction and consequently allow for better performance. In this case, the rotor's electrical connection to the ground plane is maintained through contact with the central bearing during rotation. This micromotor rotor may or may not employ dimples, but the inventors believe that improved rotation rate and start/stop performance will be achieved with these present. Such an electrostatically levitated micro-motor is depicted in the simplified cross-section of second image 820 in FIG. 8. Optionally, the electrostatic electrode around the micromotor rotor may be continuous, partial, periodically disposed, etc. according to the design of the overall component. For example, in third image 830 the electro-static electrode is depicted disposed atop the optical waveguide on one side of the micro-motor and to the insulator of the SOI wafer on the other side.

Figure 9:
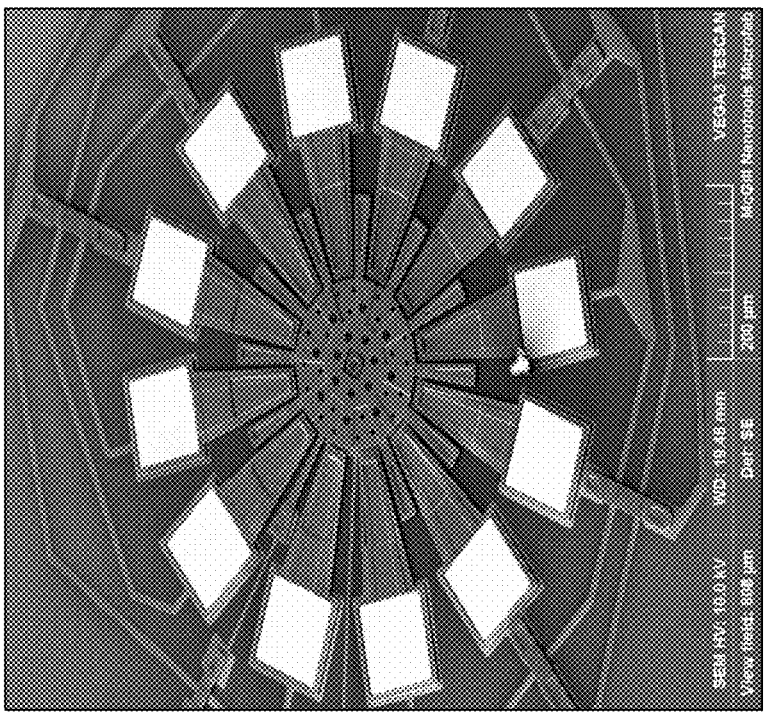
FIG. 9 depicts SEM micrographs of micro-motor based MOEMS swept optical elements according to embodiments of the invention.
Figure 9:
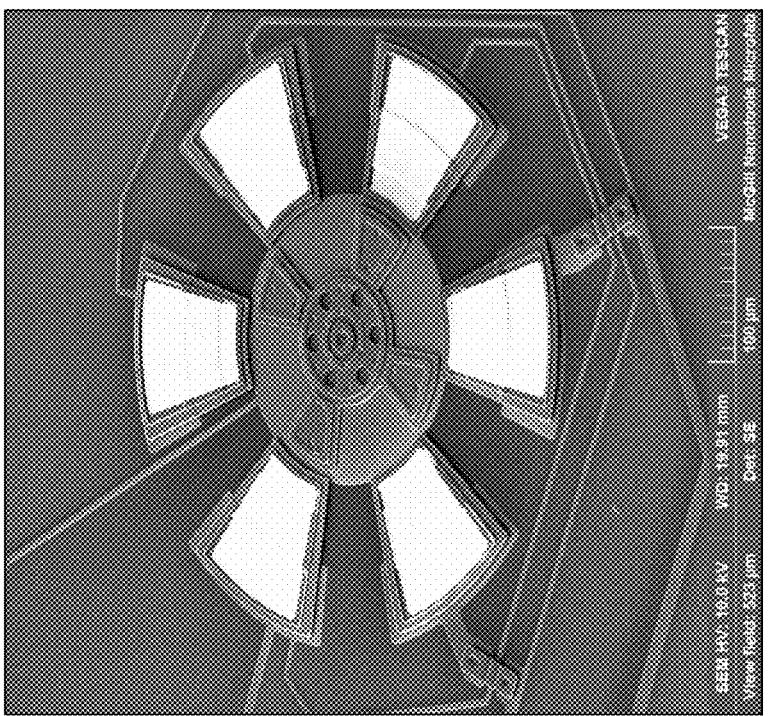

Now referring to FIG. 9 there are depicted first and second SEM micrographs 900 and 950 in respect of prototype micro-motors implemented using the design methodologies of the inventors upon a commercial MEMS surface micromachining process, namely the POLYMUMPs process from MEMSCAP. However, the inventors note that the optical stack of embodiments of the invention for micro-motor based MOEMS cannot be implemented with this "prior art" process. First SEM micrograph 900 there are depicted micro-motors according to an embodiment of the invention with 6-stator poles and 4 rotor poles respectively. Second SEM micrograph depicts a micro-motor with electrostatic levitation electrode and comprising 12 stator poles and 8 rotor poles. It would be evident that other designs in respect of levitation electrode(s), number of stator poles and number of rotor poles may be implemented within the scope of embodiments of the invention.

C: Levitated Rotor Based Microelectromechanical Systems (LERO MEMS)

As noted in Section A microelectromechanical systems (MEMS) have been applied in a range of optical devices and microoptoelectromechanical systems (MOEMS). In Section B rotor based MOEMS devices according to embodiments of the invention have been described. Within this section a novel architecture for reducing friction and improving device performance of rotor based MEMS and MOEMS is provided. In addition, a design solution is presented to mitigate a manufacturing defect that can arise.

Figure 10:
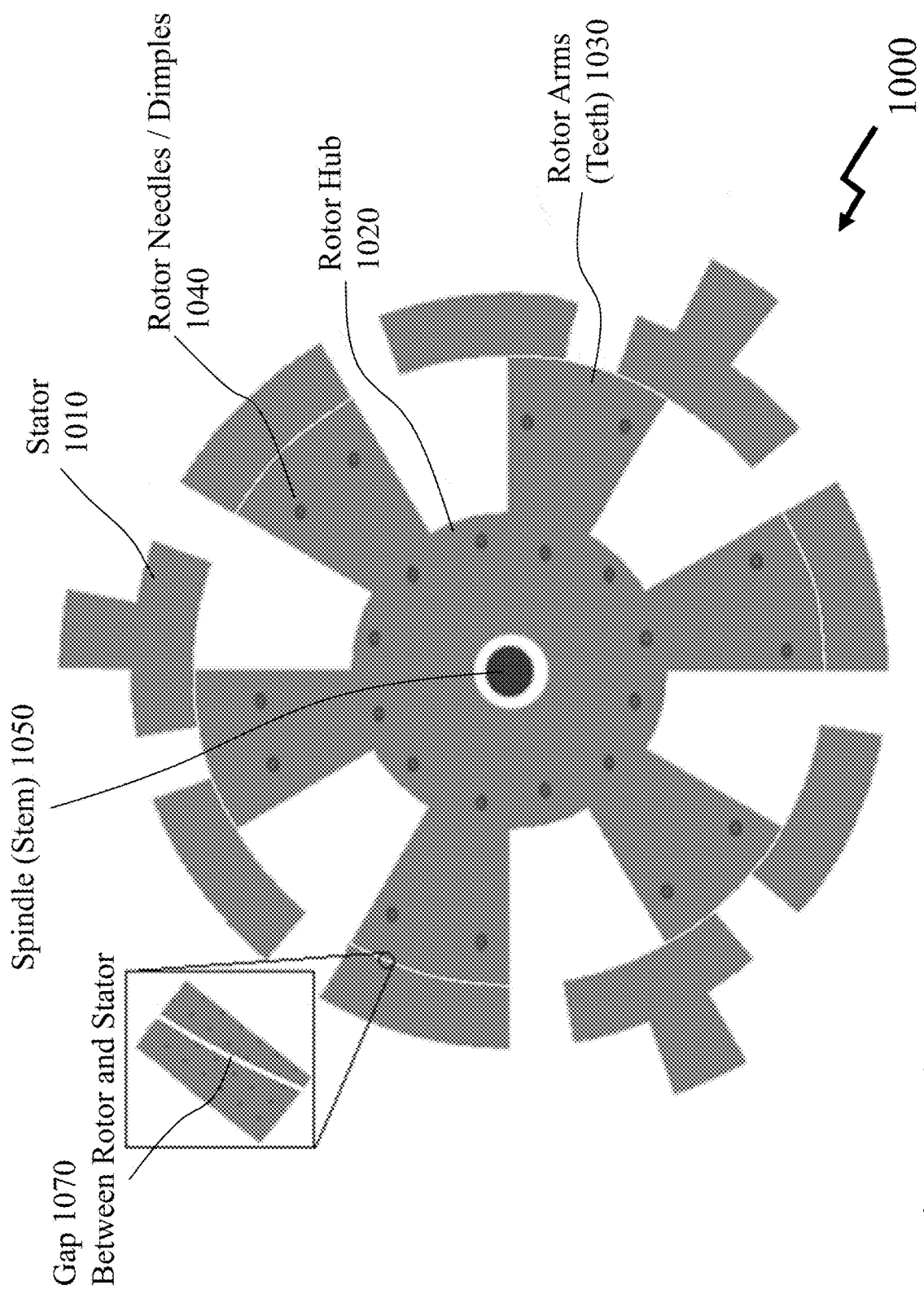
FIG. 10 depicts a schematic of a variable capacitance micromotor illustrating its main components.

An exemplary electrostatic micromotor 1000 is depicted in FIG. 10. The electrostatic forces between the various micromotor elements are responsible for rotating the movable elements of the micromotor 1000. The elements can be made of conductor or semiconductor and referred as poles. The movable pole is called a rotor (rotor arm 1020) while the static pole is called as stator 1010. The rotor arms 1030 move around a cylindrical spindle/stem 1050 and are attached to a rotor hub 1020. The clearance between the rotor arms 1020 and the spindle/stem 1010 is such that the rotor arms 1030 can easily revolve around it with minimum friction. The rotor hub 1020 and rotor arms 1030 are supported by a plurality of rotor needles (dimples) 1040 which project down from these elements to the underlying substrate.

The size of poles lies in the range of 100's of microns such that the overall footprint of the micromotor is very low. At the micron scale electrostatic forces are very strong. Accordingly, the gap 1070 between the rotor arm 1030 and stator 1050 is a few microns, resulting in a very strong electrostatic force according to the inverse squared law. In a typical configuration, the rotor arm 1030 is grounded and a voltage with constant phase difference is applied to the stators 1010 inducing an opposite and equal charge on the rotor arms 1030. A pair of a rotor arms 1030 and stators 1050 can be approximated as a parallel plate capacitor. A net tangential force acts on the rotor plate of the capacitor causing sliding and rotation. The effective capacitance of the stator/rotor capacitor keeps on changing due to rotation. The applied excitation can be of any waveform and any frequency. Generally, in order to generate the required torque a square wave signal with operational frequencies for proper charging and discharging of the capacitor is chosen.

Figures 11A, 11B, 11C:
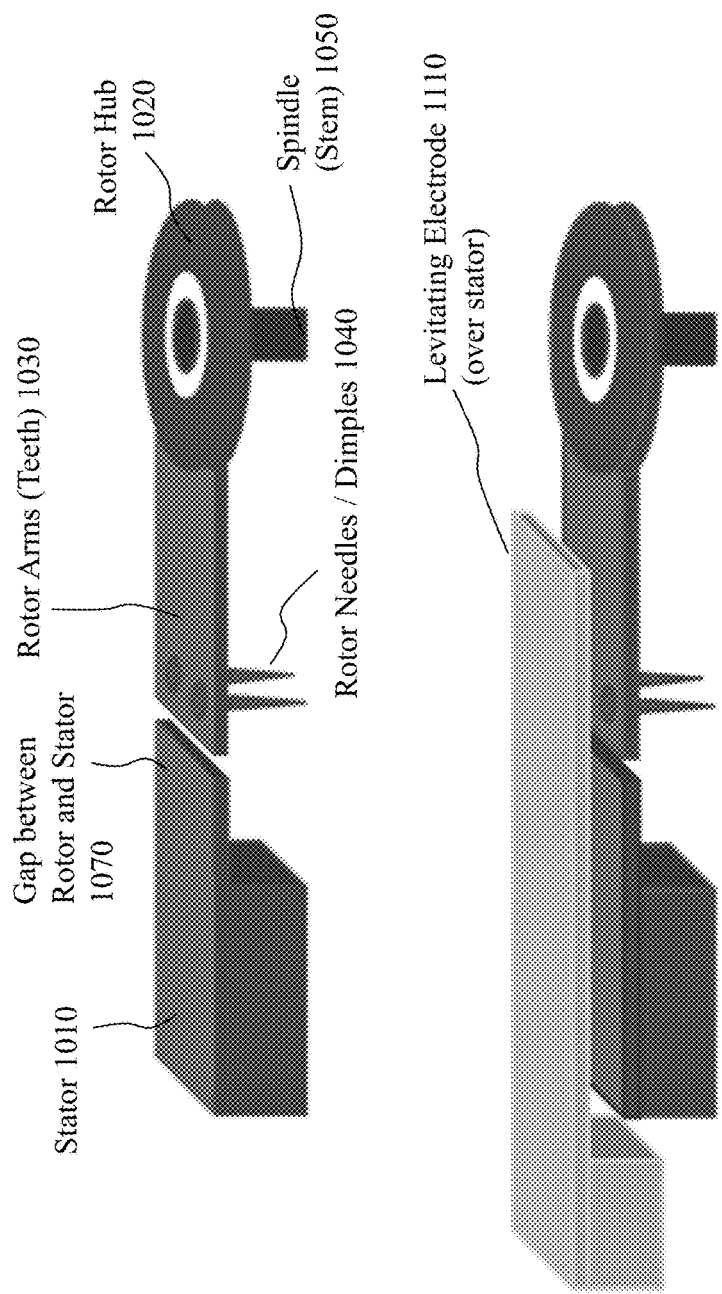
FIG. 11A depicts a single micromotor rotor arm/stator geometry illustrating its key design elements.
FIG. 11B depicts a single micromotor rotor arm/stator geometry with levitating rotor according to an embodiment of the invention illustrating its key design elements and top electrode near the periphery of the rotor.
FIG. 11C depicts a single micromotor rotor arm/stator geometry with levitating rotor according to an embodiment of the invention illustrating its key design elements and top electrode above the entire rotor.

The design of the rotor (rotor arms 1030) and stator 1010 plays an important role for the proper functioning of electrostatic motor 1000. Parameters like gap 1070 between the rotor/stator, material of the stator/rotor, thickness of the stator/rotor, number of stator and rotor poles, radius of the rotor arm, arrangement of the stator/rotor pole, etc. all require optimization. Referring to FIG. 11A there are depicted the key elements required for micromotor design wherein various critical design parameters are determined and limited by the choice of the micromotor fabrication technology. These elements are the stator 1010, rotor hub 1020, rotor arms 1030, rotor needles 1040, spindle 1050 and gap 1070. These fabrication constraints are required to avoid manufacturing defects and to ensure device integrity. For example, in the MEMSCAP™ POLYMUMPS™ process the minimum spacing is 2 µm on the same layer, thus gap between the rotor and the stator cannot be less than 2 µm.

Amongst the approaches for reducing the sliding friction of the rotor-needles and improving the excitation is the modification of micromotor architecture. In this approach, various electrodes of the micromotor are arranged and designed to reap the maximum benefit of the fabrication technology for generating the motive torque with optimum excitation. A series of dimples on the rotor layer cause the formation of needle like shape during the fabrication process. These rotor-needles are responsible for supporting the rotor over the substrate and also providing the electrical contact. During the rotary motion of the rotor hub/rotor arm assembly, this rotor assembly touches the spindle/stem and causes friction, which is unavoidable for the rotation of the micromotor. The rotor-needles slide over the substrate during the motion and are responsible for the other friction arising within prior art MEMS rotors.

According to embodiments of the invention the rotor-needle friction is reduced by the implementation of a LEvitating ROtor MEMS (LERO-MEMS) for use within MEMS devices and MOEMS devices. A LEOR-MEMS as depicted in FIGS. 11B and 11C according to embodiments of the invention exploits additional levitating electrodes 1110 and 1120 respectively. Within FIG. 11B the levitating electrode 1110 is disposed only over the stator 1010 and an end of the rotor arms as they pass the stator. Within FIG. 11C the levitating electrode 1120 is disposed over the stators to the rotor axis. Applying an external bias to either of the levitating electrodes 1110 and 1120 relative to the rotor arms 1030 electrostatically raising the rotor hub 1020 and rotor arms 1030 from the substrate thereby reducing the needle friction. The vertical gap between the rotor and the top electrode is a few hundred nanometers but the external bias is applied levitating the rotor due to electrostatic forces.

Accordingly, the rotor of the micromotor is lifted up such that the rotor-needles either do not touch the substrate or only partially touch the substrate. Accordingly, reducing the friction also reduces the excitation required for inducing the rotor into motion. The reduction of friction also reduces the wear and tear of the device, leading to an increase in overall lifetime. It would be evident that the degree of rotor levitation can be adjusted using the external bias so that is acts as a contact controller between the rotor-needles and the substrate. This PROgrammable Touch (PRO-Touch) feature offered by the contact controller can be applied to the specific rotor-needles. Micromotors with limited PRO-Touch and full PRO-Touch can be designed by controlling the number of rotor-needles accessed by the contact controller.

LERO-MEMS with Limited PRO-Touch

In this design, the rotor is levitated by applying an electrostatic force to lift the rotor arms near the edges of the rotor arms/teeth. The top electrode is extended up FIG. 11B. Only the rotor-needles that come under the top electrode experience the electrostatic force. The top electrode can be of any suitable geometrical shape such that the generated electrostatic force is experienced by the rotor-needles on applying bias. The top electrode is not connected to any stator/rotor electrically and physically, even though it passes over the stators.

LERO-MEMS with Full PRO-Touch

In this design, the rotor is levitated by applying an electrostatic force to lift across the whole rotor assembly. Accordingly, the top electrode covers the entire rotor area as shown in FIG. 11C. Accordingly, all of the rotor-needles experience the vertical electrostatic lifting force from the top electrode simultaneously. The top electrode can be one of a range of geometries, e.g. circular, square or any suitable geometrical or non-geometrical shape as long it covers the entire or substantially the entire rotor area, such that it can provide vertical electrostatic lifting for the whole rotor assembly and hence to all the rotor-needles. The top electrode is not connected to any stator/rotor electrically or physically, even though it passes over the stators.

Design Guidelines for LERO-MEMS

Semiconductor technologies, such as MEMSCAP™ POLYMUMPS™, employed for the fabrication of MEMS devices and MOEMS devices employ a sequence of consecutive layer deposition and removal with are performed with micron precision. However, as the layer deposition is conformal innovations in the circuit layout design are required in order to avoid layers overlapping and merging. The top electrode can form stringer like structures due to conformal layer deposition, which can immobilize the device as the top electrode blocks the rotor. These stringers should not hang in the regions required for the motion of the rotor layer as depicted in FIG. 12A wherein the stringer 1210 is depicted with respect to the top electrode 1120 and rotor 1110. Accordingly, the inventors have established the geometry depicted in FIG. 12B with the top electrode 1120 depicted relative to the rotor 1110 and stator 1130.

It is also important that there are sufficient etch holes within the rotor and rotor hub on each layer for removing processing residues formed during the etching processes in the fabrication of the device. These residues whilst typically small in size can settle in the regions such as between the rotor-stator gap, which may hinder the mechanical and electrical operation of the device.

Figure 13:
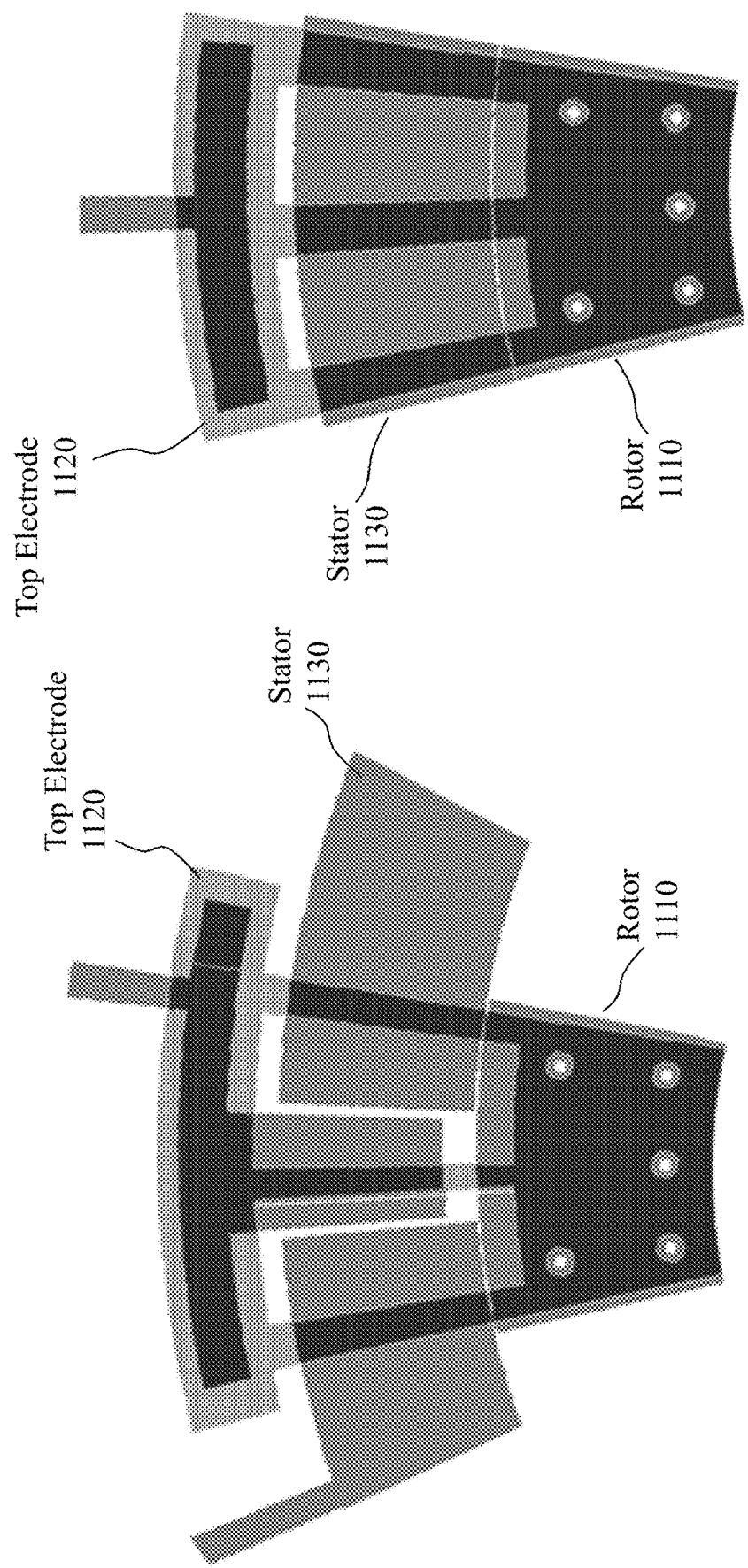
FIG. 13 depicts schematically a top view of a design layout according to an embodiment of the invention exploiting toroid perforations in the top electrode.
Figure 14:
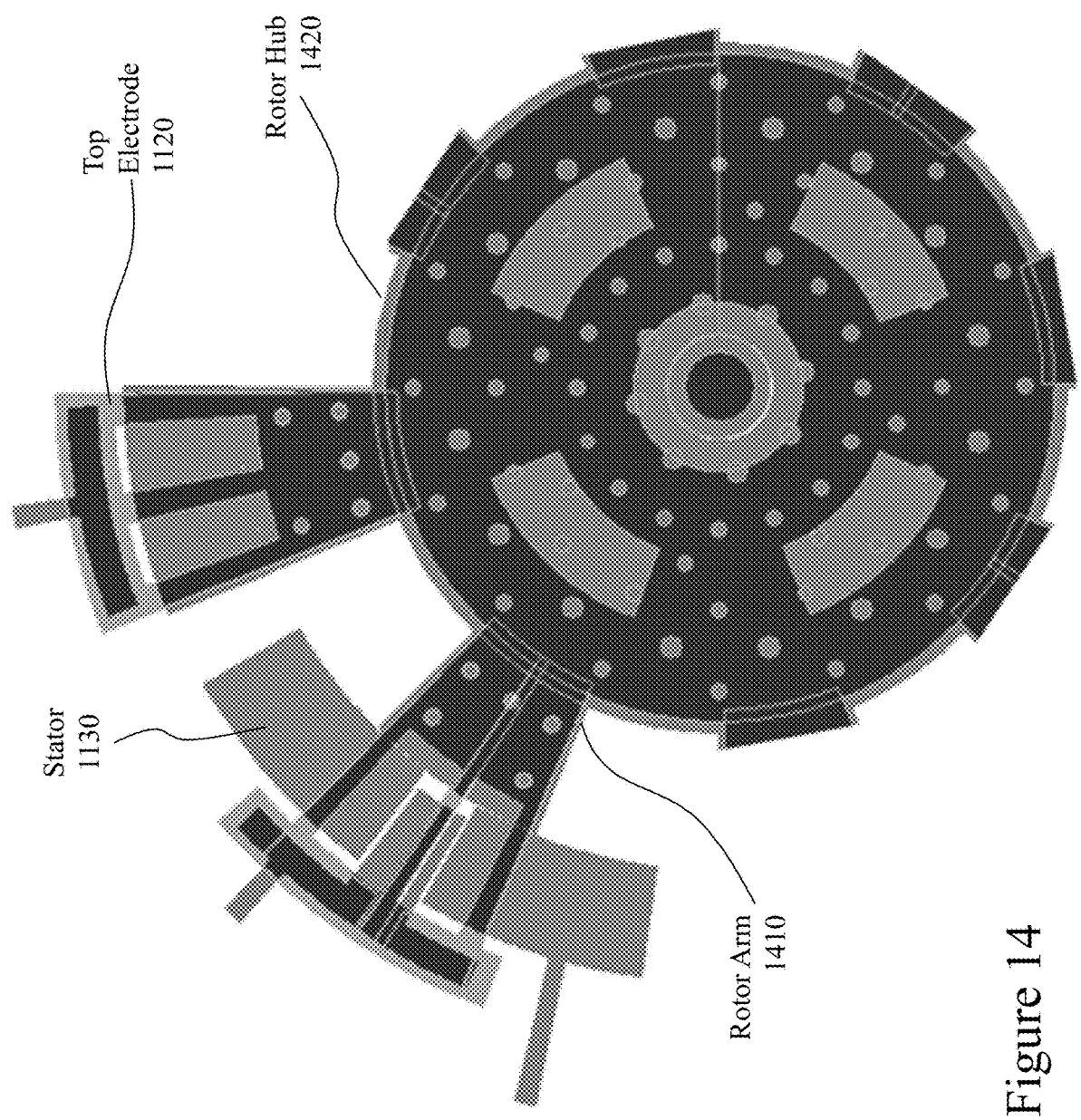
FIG. 14 depicts schematically a top view of a design layout according to an embodiment of the invention exploiting toroid perforations in the top electrode over the rotor hub.

FIGS. 13 and 14 depict a top electrode design according to an embodiment of the invention exploiting toroid shaped perforation for removing the etch residues in conjunction with the top electrode geometry employed to avoid the fabrication issues relating to "stringers" discussed supra. Similar arrangements can be designed and implemented in respect of other geometrical rotor designs.

Although a circular geometry of the top electrode is shown in FIG. 14 other designs may also be employed without departing from the scope of the invention. Such shapes may include regular polygons such as square, rectangle, hexagon, etc. or any irregular polygon can be employed for the top electrode design provided that the necessary connecting rods/beams for hanging the top electrode over the rotor as provided. These connecting rods/beams cannot be connected electrically or physically to any poles of the MEMS/MOEMS rotor in order to ensure the external biasing of the top electrode and to avoid short circuit. A LERO-MEMS micromotor design can, however, have a common signal for the top electrode and the stators, in which case there can be physical and electrical connection between the rods/beams and the stators. In order embodiments of the invention the electrical connections for the rotor, stator and top electrode may be discrete connections allowing the levitation to be adjusted independent of the drive signal for the device.

Figure 15:
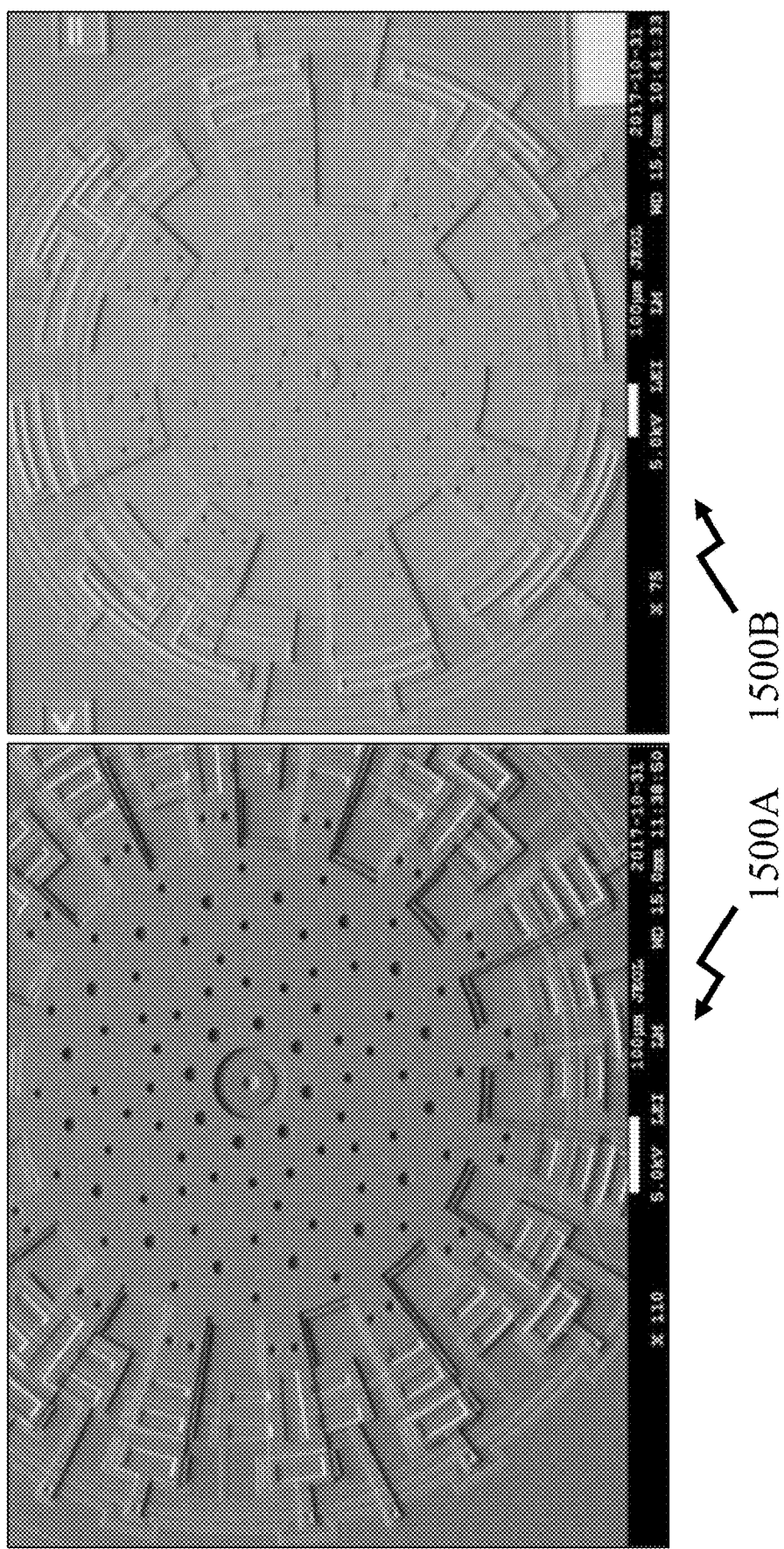
FIG. 15 depicts SEM images of levitating rotors according to embodiments of the invention with Full PRO-Touch and Limited PRO-Touch.
Figure 16:
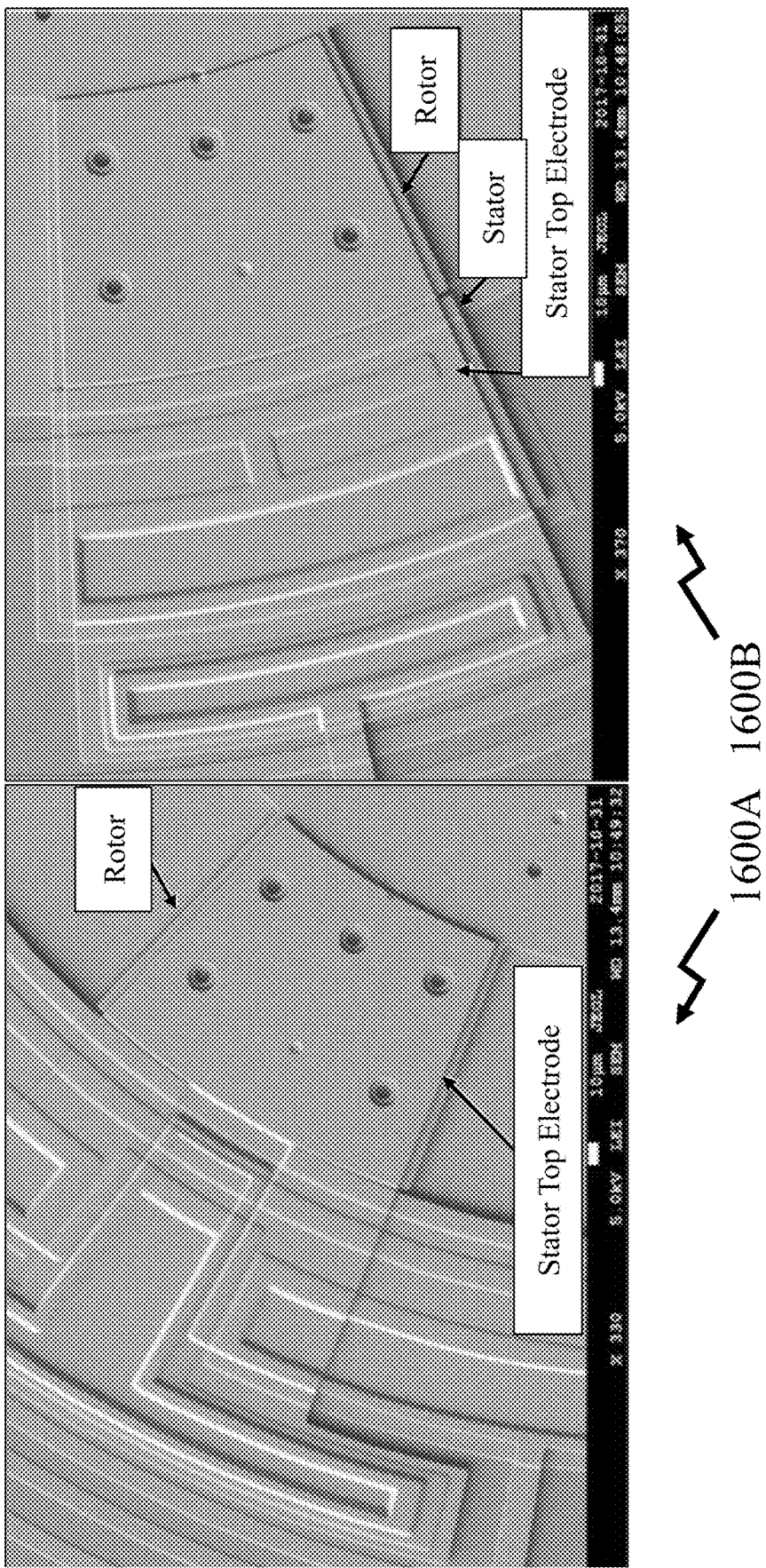
FIG. 16 depicts SEM images of levitating rotors according to embodiments of the invention avoiding stringers during manufacturing.
Figure 17:
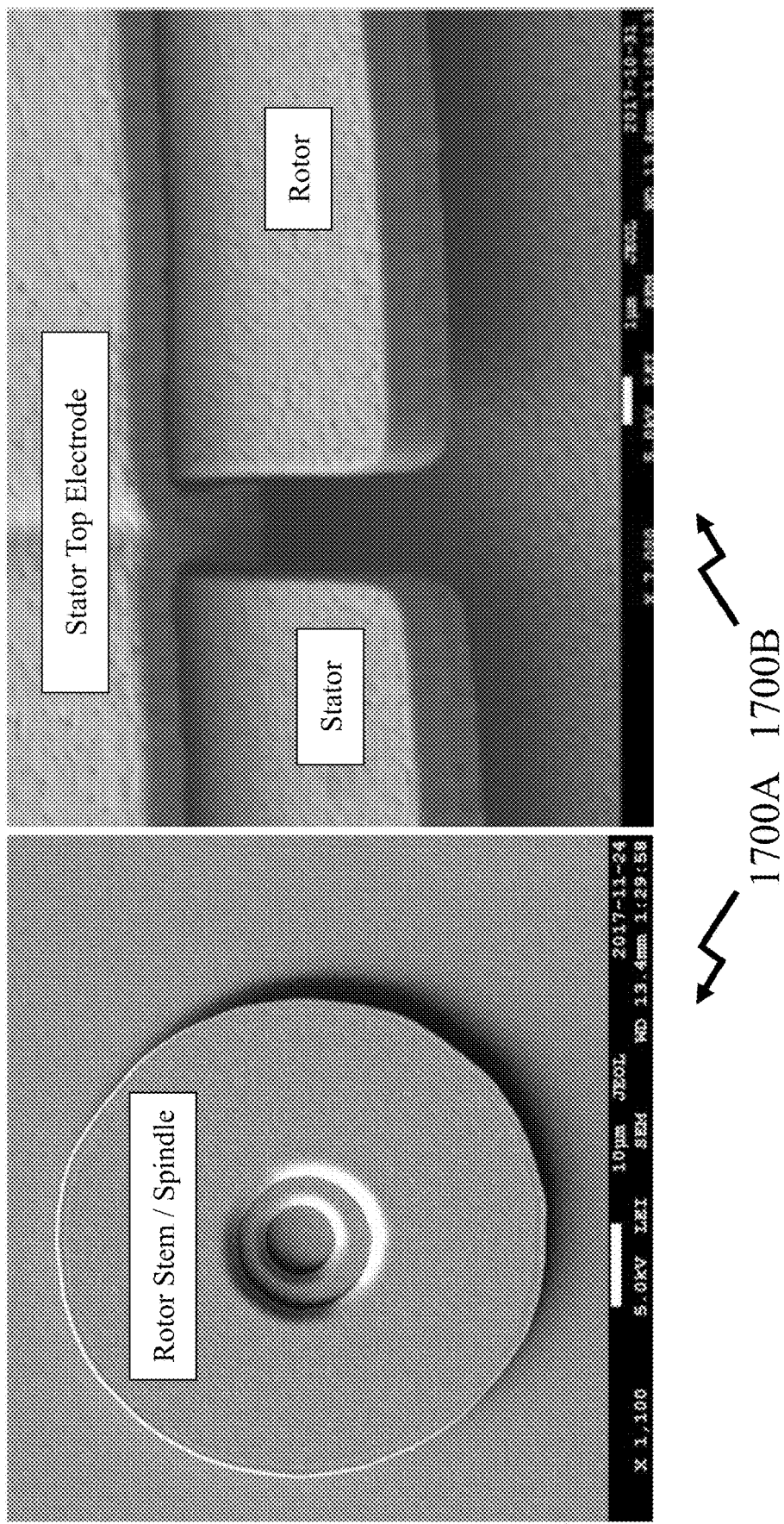
FIG. 17 depicts SEM images of a rotor stem/spindle and the gap between the stator and electrode with top electrode respectively for levitating rotors according to embodiments of the invention.

The inventors have demonstrated prototypes of LERO-MEMS micromotors according to embodiments of the invention exploiting the commercial MEMSCAP™ POLYMUMPS™ process. FIGS. 15 to 17 depict SEM images of these prototype devices. The stator to rotor gap is 2 µm in each instance and the ratio of stator to rotor is 3:2. LERO-MEMS micromotors with 8, 16, and 32 rotors have been fabricated. The rotor and stator are implemented in the POLY1, a 2 µm undoped polysilicon layer, of the POLYMUMPS™ process, whilst the top electrode and spindle are implemented within the POLY2, a 1.5 µm undoped polysilicon layer, in the fabrication technology. The clearance between the spindle and the rotor hub is 750 nm. The rotor hub radius was varied from 150-300 μm whilst the length of the rotor arms from the hub was varied from 50-150 μm. Motors having similar design specifications with perforation in the top electrode can also be designed and fabricated. The perforation can be of any shape but should enhance the removal of etch residues without affecting the PRO-Touch feature. It would be evident that the biasing of the top levitation electrode can be made independent of the other driving electrodes biasing.

Figure 18:
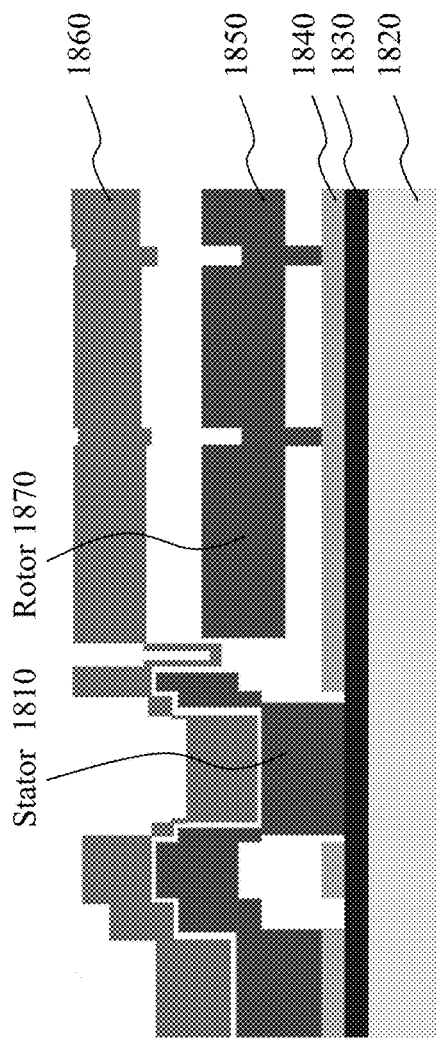
FIG. 18 depicts a schematic cross-section of a levitating rotor based micromotor according to embodiments of the invention with a wide beam over the stator for electrical connections.
Figure 19:
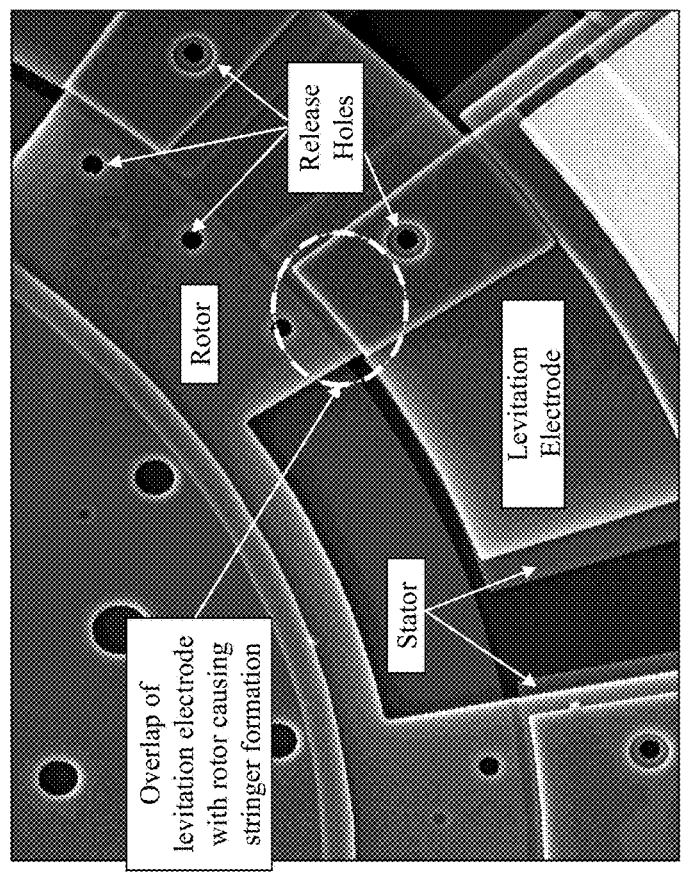
FIG. 19 depicts an SEM image comprising a top view of a levitating rotor based micromotor according to embodiments of the invention depicting the regions having stringer formation during manufacturing.

D: Design Variants of Levitating Micro-Motor for Improved Manufacturing Processes and Yields Referring to FIG. 18 there is depicted a schematic cross-section of a levitating rotor based micromotor according to embodiments of the invention with a wide beam over the stator for electrical connections wherein an as fabricated device is depicted in FIG. 19. Accordingly, within FIG. 18 the stator 1810 and rotor 1870 are depicted formed within the 2 μm polysilicon (POLY-1) 1850. Disposed below the POLY-1 1850 is a 0.5 μm polysilicon (POLY-0) 1840 on top of which the supporting dimples of the rotor move. Below POLY-0 1840 is a silicon nitride 1830 layer and the substrate 1820. Disposed above the rotor 1850 there is depicted a levitation electrode 1860 formed from 1.5 μm polysilicon (POLY-2) 1860. FIG. 19 depicts an SEM image comprising a top view of a levitating rotor based micromotor according to embodiments of the invention depicting the regions. having stringer formation during manufacturing. The release holes in the levitation electrode are required for the removing of the residual material produced during the etching process. Where the levitation electrode overlaps with the rotor stringers are formed between the levitation electrode and rotor which prevent the rotor from moving. These stringers are formed in those areas where the rotor and stator are not aligned and the beam supporting the levitation electrode is lying beyond the stator/rotor overlap region.

Accordingly, the inventors have established a series of manufacturing and design improvements over the design described and depicted in respect of FIGS. 2A to 17 respectively.

Figure 20:
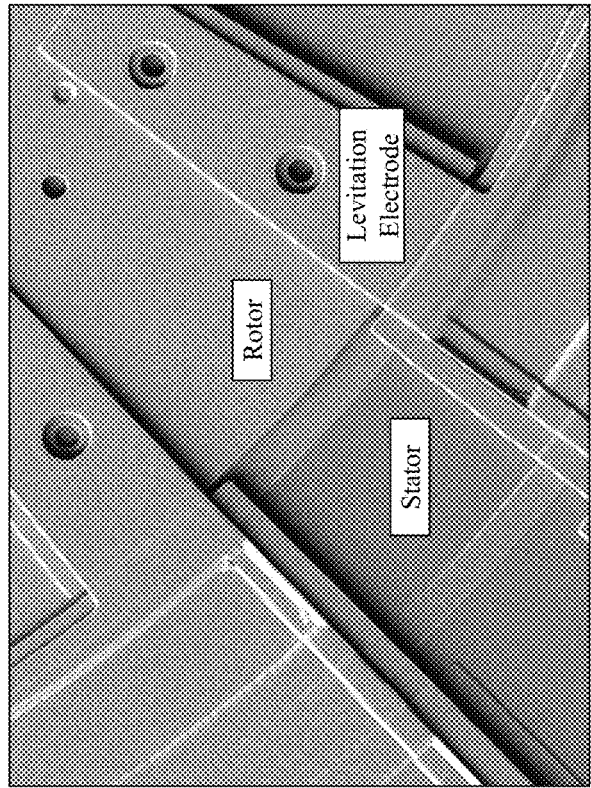
FIG. 20 depicts an SEM image comprising top view of a levitating rotor based micromotor according to an embodiment of the invention without stringer formation during manufacturing through improved support beam configuration.

D1: Partial Removal of Levitation Support Beam:

According to this improvement the layout of the levitating micromotor according to embodiments of the invention is adjusted such that the support beam of the levitation electrode is removed from the overlapping areas to avoid stringer and lies within the boundaries of the stator/rotor overlap region. Referring to FIG. 20 there is depicted an SEM image comprising top view of a levitating rotor based micromotor according to an embodiment of the invention without stringer formation during manufacturing through improved support beam configuration.

Figure 21:
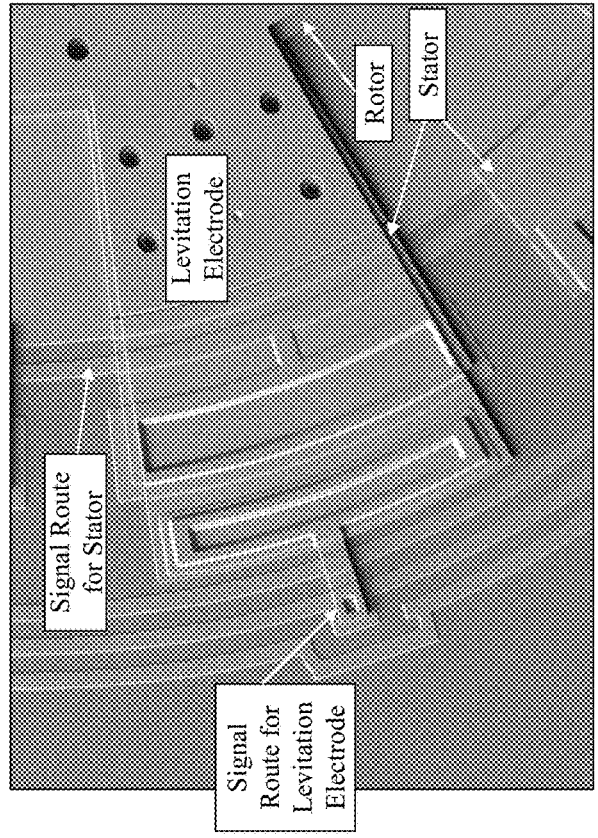
FIG. 21 depicts an SEM image comprising top view of a levitating rotor based micromotor according to an embodiment of the invention.
Figure 22:
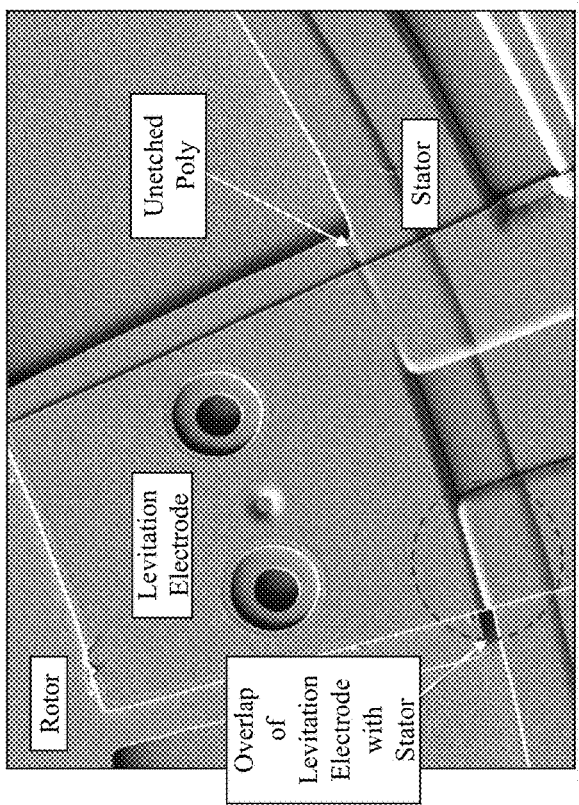
FIG. 22 depicts an SEM image of a levitating rotor based micromotor according to an embodiment of the invention with unetched polysilicon between rotor and stator.
Figure 23:
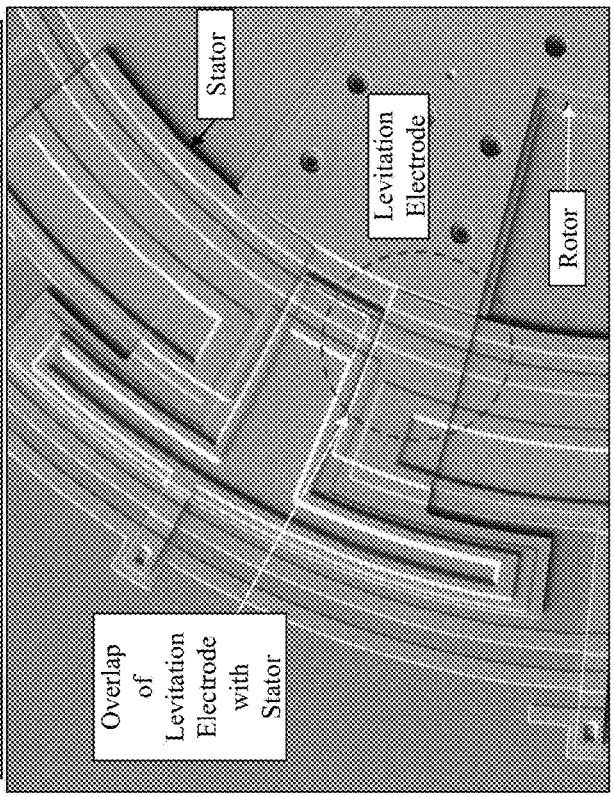
FIG. 23 depicts an SEM image comprising overlap between the stator and levitation electrode causing stringers within a levitating rotor based micromotor according to an embodiment of the invention.

This design removes the stringer formation at the rotor/levitation electrode, but the rotor is still not able to move freely with high yield for manufactured devices. The levitation electrode does not form a stringer, but it is completely covering the stator electrode as shown in FIG. 21 which depicts an SEM image comprising top view of a levitating rotor based micromotor according to this embodiment of the invention. The overlap of levitation electrode with the stator is shown in the FIGS. 22 and 23 respectively. FIG. 22 depicts an SEM image of the levitating rotor based micromotor according to an embodiment of the invention with unetched polysilicon between rotor and stator. FIG. 23 depicts an SEM image comprising the overlap between the stator and levitation electrode causing stringers within a levitating rotor based micromotor according to an embodiment of the invention.

It is evident that the density of release holes on the levitation electrode is low, in this configuration, and that there are no release holes near the rotor/stator gap. The restricted movement of the rotor therefore arising, in the inventor's view, through the stiction between the stator and levitation electrode in the overlap region. The rotor and stator are also connected due to the presence of unetched polysilicon as evident in FIG. 22.

D2: Support Beam with Large Etch Holes:

Within this alternate embodiment of the invention the support beam for the levitation electrode is perforated with large etch holes, to reduce the overlap between the levitation electrode and the stator. The free space of the etch holes provides wide passage for the removal of etch residuals. The levitation support beam is also restricted within the boundary of the stator to avoid stringer formation.

Figures 24, 25:
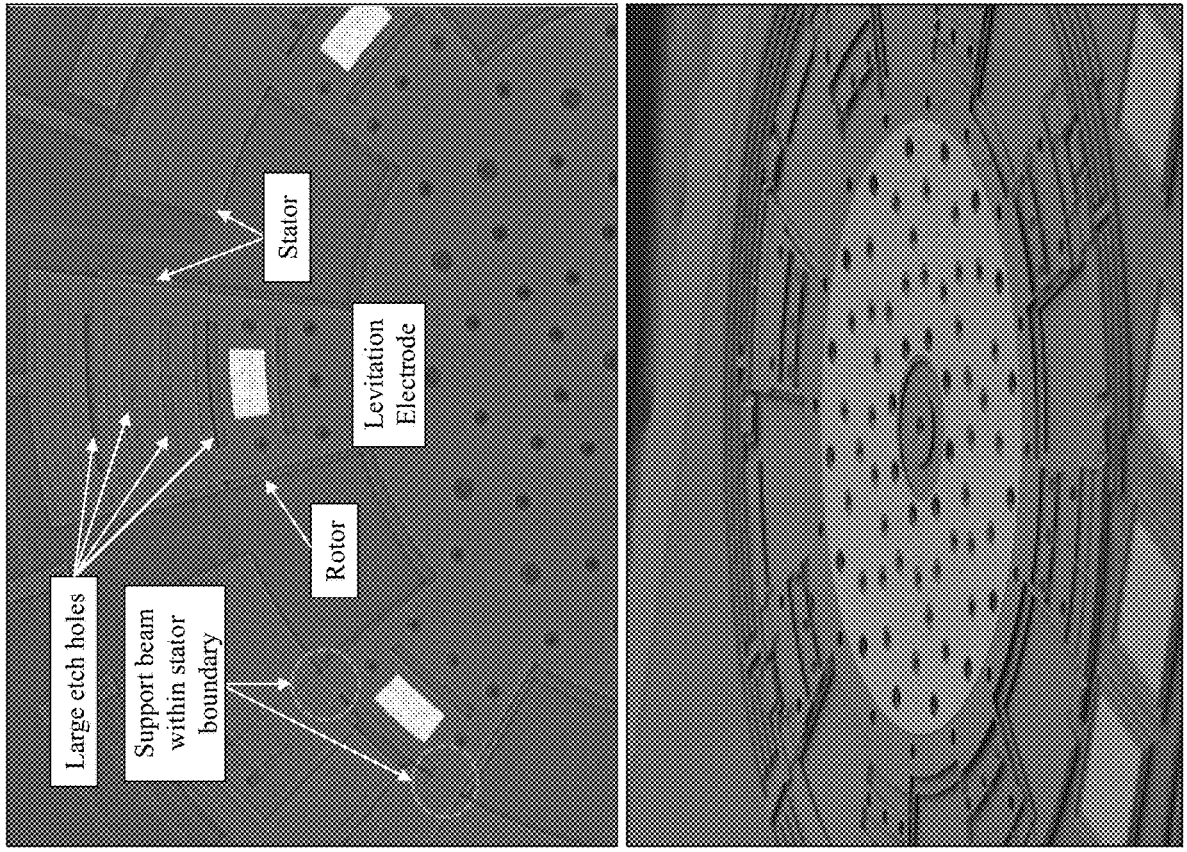
FIG. 24 depicts an SEM image comprising large etch holes with no stringer formation within a levitating rotor based micromotor according to an embodiment of the invention.
FIG. 25 depicts an SEM image of levitating rotor based micromotor according to an embodiment of the invention with thin support beams for levitation electrode.

FIG. 24 depicts an SEM image comprising large etch holes with no stringer formation within a levitating rotor based micromotor according to this embodiment of the invention. As evident larger rectangular etch holes are formed within the levitation electrode support beam are implemented. The support beam is also restricted within the boundary of stator to avoid stringer formation. However, manufacture of the rotor still results in devices where the rotor is not able to move freely and shows stiction in the rotor-stator gap region. The inventors attribute this to the overhang/falling of the support beam into the gap causing stiction with either the rotor or stator. This may arise from difficulty in etching within the rotor-stator gap region, yielding un-etched material (e.g. polysilicon) thereby preventing motion of the rotor.

Figure 26:
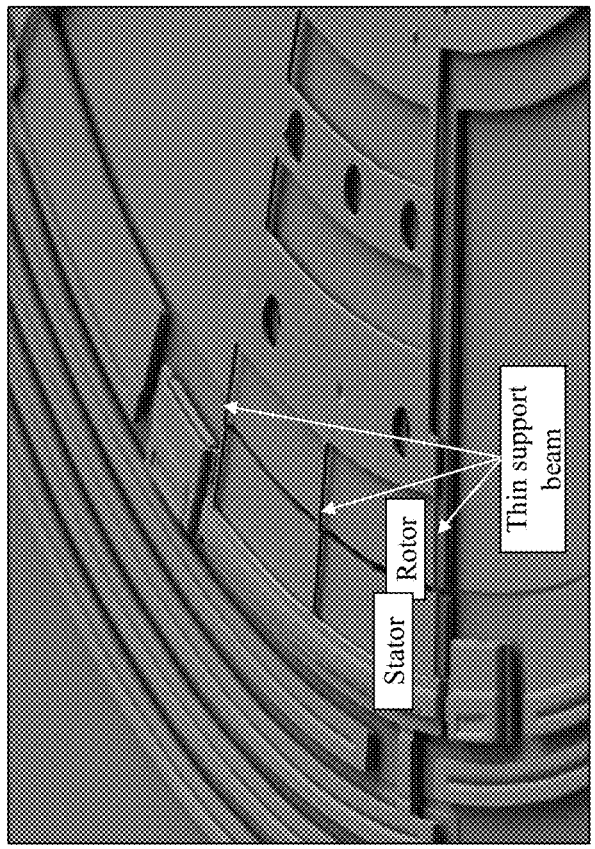
FIG. 26 depicts an SEM image comprising thin support beams for a levitation electrode within a levitating rotor based micromotor according to an embodiment of the invention.
Figure 27:
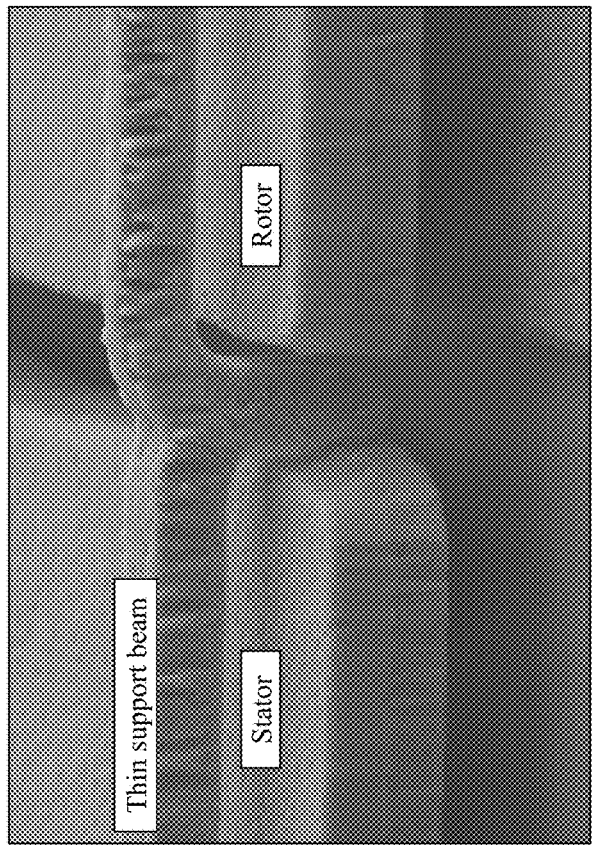
FIG. 27 depicts an SEM image comprising support beam overhang in the rotor/stator gap within a levitating rotor based micromotor according to an embodiment of the invention.

D3: Thin Support Beam:

Within this design variant the width of the support beam for the levitation electrode is reduced to minimize the hanging structure falling in the gap. Another approach, to minimize the stiction and to provide more space for etching is to modify the shape of the rotor and stator in the form of small tooth array. The fabricated micromotor with the thin support beam and very large etch holes is shown in FIG. 25. The levitation electrode is supported by three thin beams as shown in FIG. 26 where the thin support beam also falls into the stator/rotor gap causing an overhang as depicted in FIG. 27. The rotor can move freely but the small clearance between the rotor and the levitation electrode means that the overhanging structure touches the stator/rotor.

Figure 28:
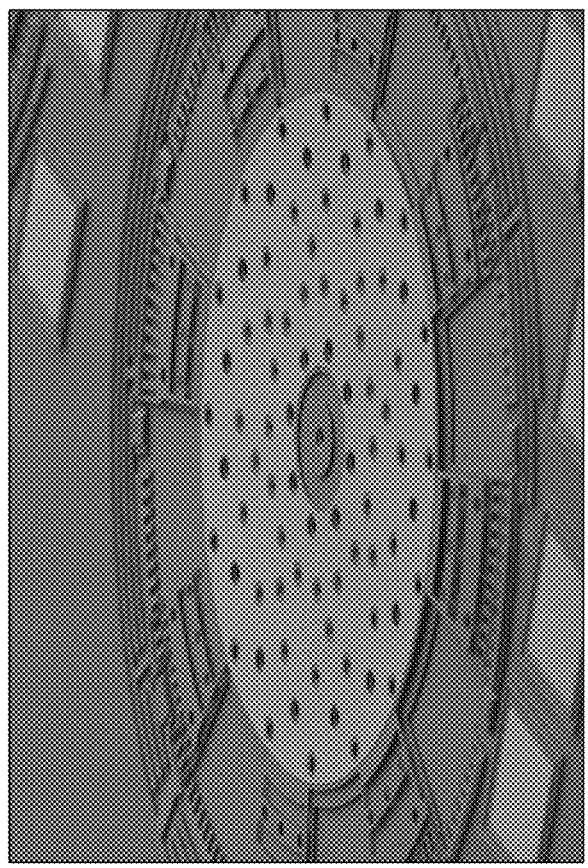
FIG. 28 depicts an SEM image comprising teeth shape rotor/stator within a levitating rotor based micromotor according to an embodiment of the invention.
Figure 29:
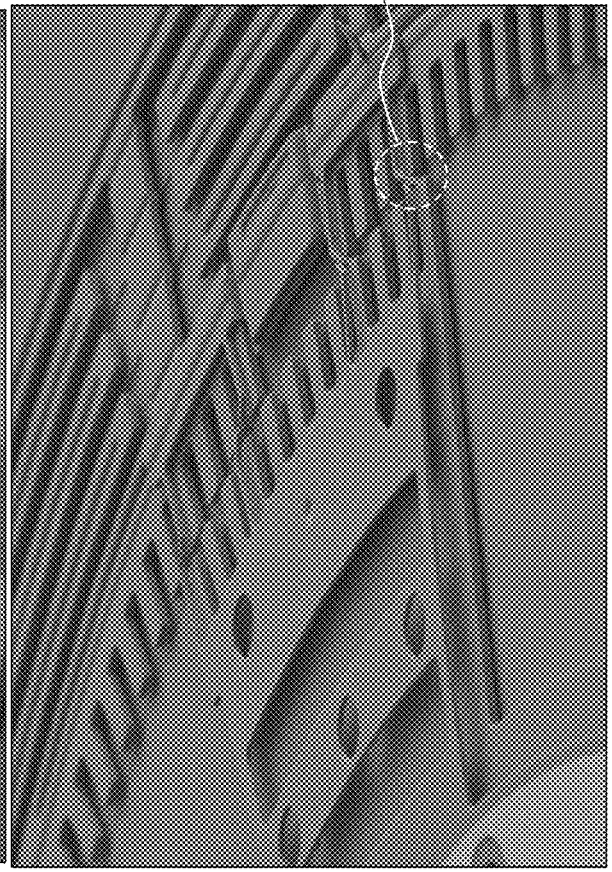
FIGS. 29 to 31 SEM images relating to beam overhang in the rotor/stator gap within a levitating rotor based micromotor according to an embodiment of the invention.
Figures 30, 31:
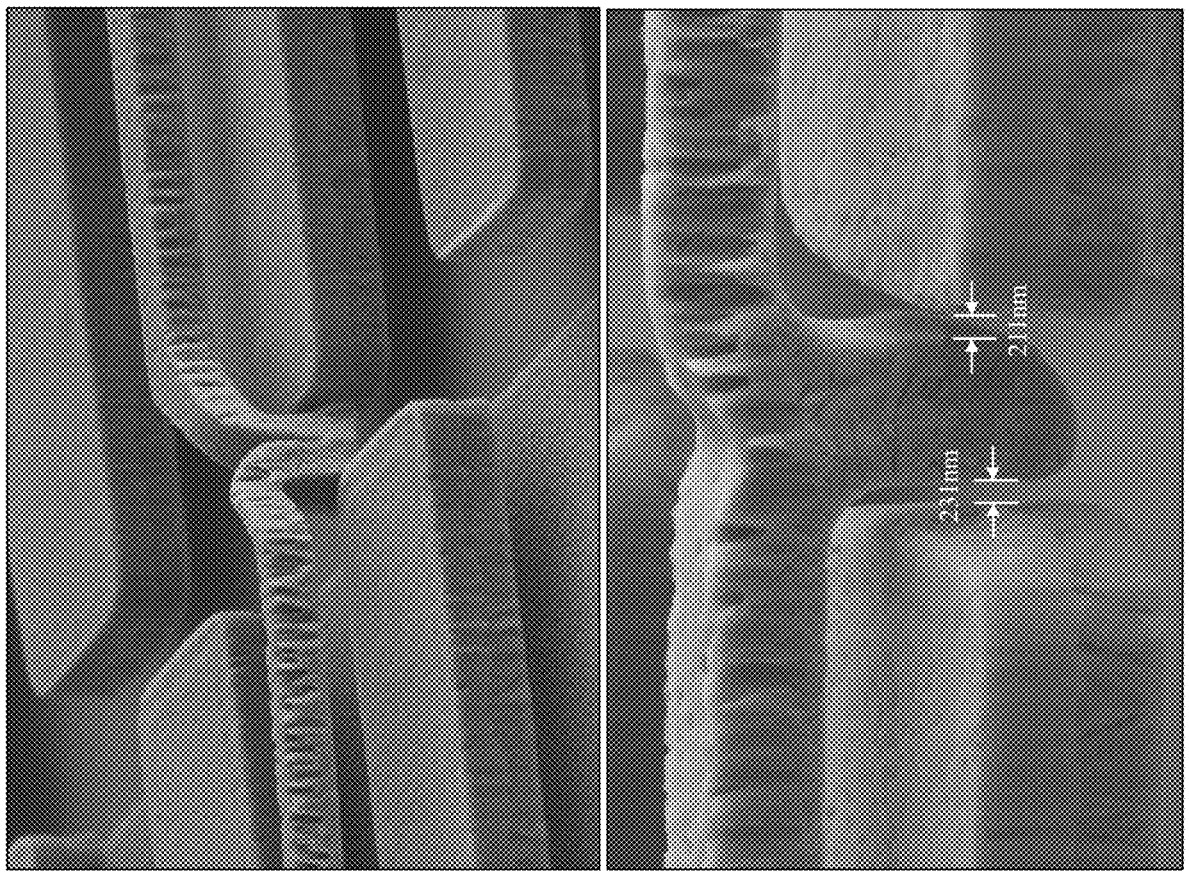

D4: Thin Support Beams with Large Etch Holes and Tooth Shaped Rotor/Stator:

Within this design variant of an embodiment of the invention the levitating micromotor design is adjusted to include both the thin support beams and the large etch holes within the levitation electrode but these are now employed in conjunction with a tooth shape rotor/stator configuration. Accordingly, FIG. 28 depicts an SEM image of this design employing teeth shape rotor/stator elements within a levitating rotor based micromotor according to an embodiment of the invention. The levitation electrode is supported by three thin support beam as depicted in FIG. 29. Accordingly, the support beam hangs into the stator/rotor gap as depicted in FIG. 30 which is a high magnification image of region 2950 in FIG. 29 for that portion of the levitating micromotor according to this embodiment of the invention. The overhang is further shown in FIG. 31 and whilst it is not touching any electrode the as fabricated gaps are small, shown as 231 nm and 211 nm respectively. The rotor can move freely but it may touch the overhanging structure. For example, mechanical vibration may lead to the touching of the stator with the overhanging structure due to the low clearance between the electrodes.

D5: Floating Polysilicon Structure for Supporting the Beam:

According to these design variations for a levitating micromotor according to embodiments of the invention an additional floating polysilicon structure is provided for supporting the beam. The levitation support beam passes over the stator and rotor to provide electrical connection(s) with the levitation electrode. The support beams whilst thin overlap with the rotor and stator and may cause stiction between the various electrodes if the unwanted materials are not completely removed during the fabrication. The floating polysilicon structure adjusts the design by removing the overlap between the levitation electrode and the other electrodes. The floating polysilicon provides the necessary height to the supporting beam for connection and must be removed after the release process.

Figure 33:
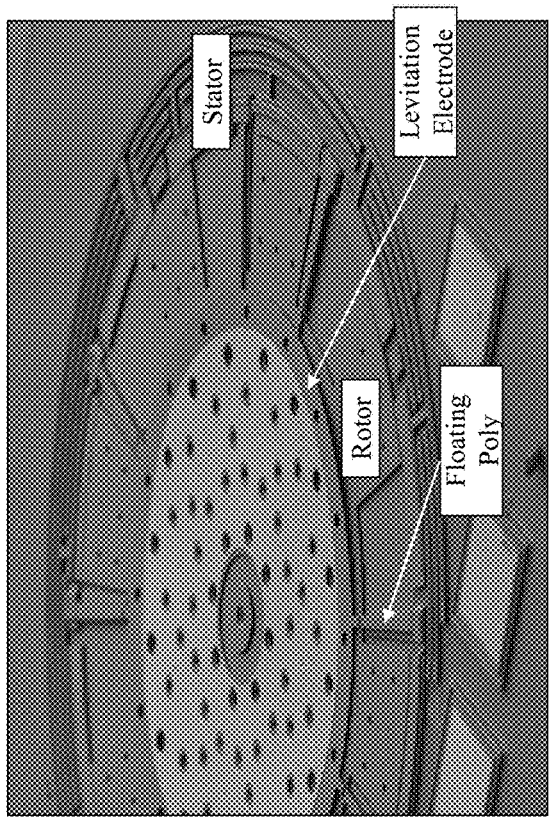
FIG. 33 depicts an SEM image comprising micromotor with floating polysilicon within a levitating rotor based micromotor according to an embodiment of the invention.
Figure 34:
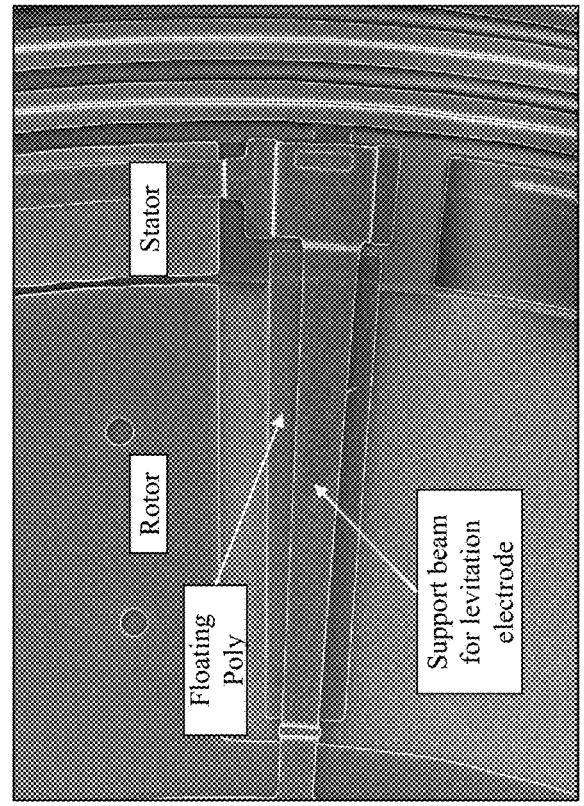
FIG. 34 depicts an SEM image comprising top view of the floating polysilicon for beam support within a levitating rotor based micromotor according to an embodiment of the invention.
Figure 32:
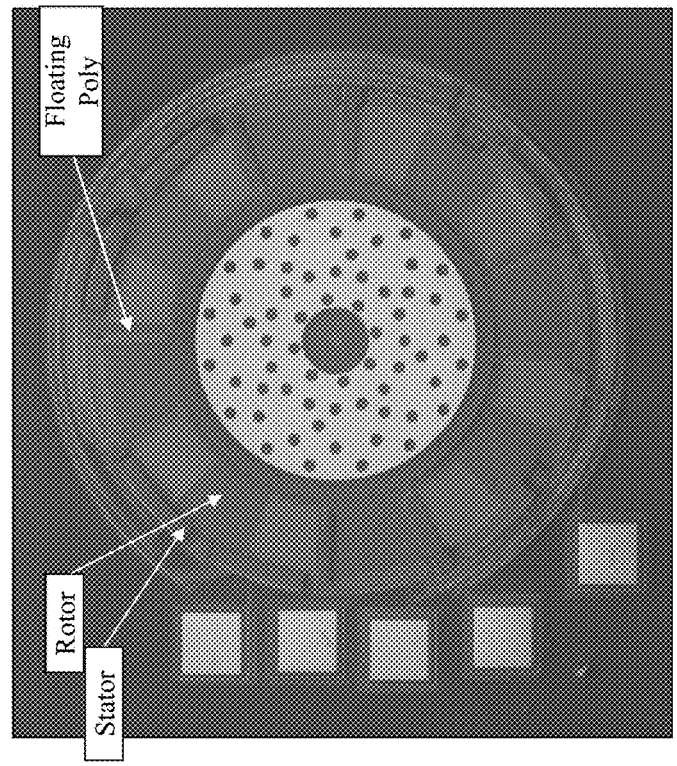
FIG. 32 depicts an SEM image comprising the top view of the micromotor with floating polysilicon within a levitating rotor based micromotor according to an embodiment of the invention.

Accordingly, referring to FIGS. 32 to 34 there are depicted SEM images of the levitating rotor based micromotor according to an embodiment of the invention with floating polysilicon structure. FIG. 32 depicts a top view of a fabricated levitating rotor based micromotor whilst FIG. 33 depicts a perspective view. FIG. 34 depicts a zoomed plan view showing the levitating electrode atop the support beam which passes over the stator and rotor.

Figure 35:
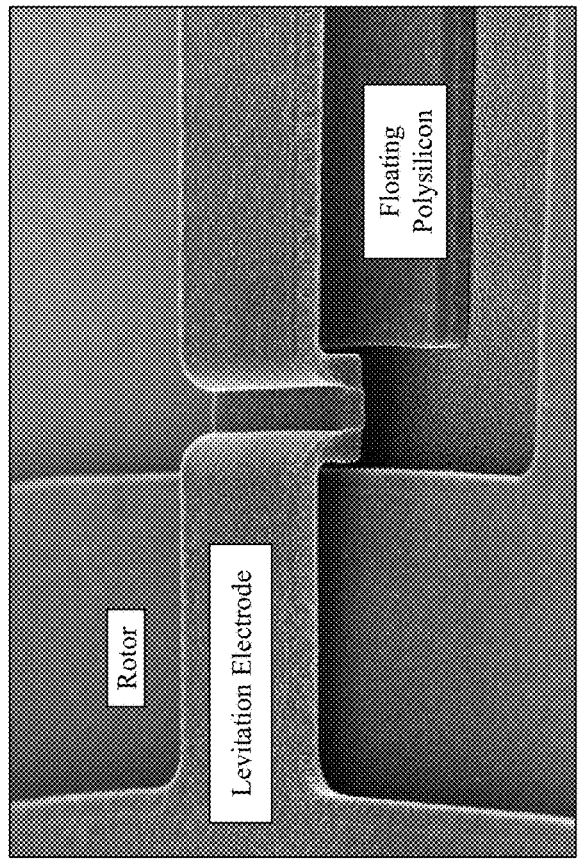
FIG. 35 depicts an SEM image comprising supporting beam overhang near floating polysilicon within a levitating rotor based micromotor according to an embodiment of the invention.
Figure 36:
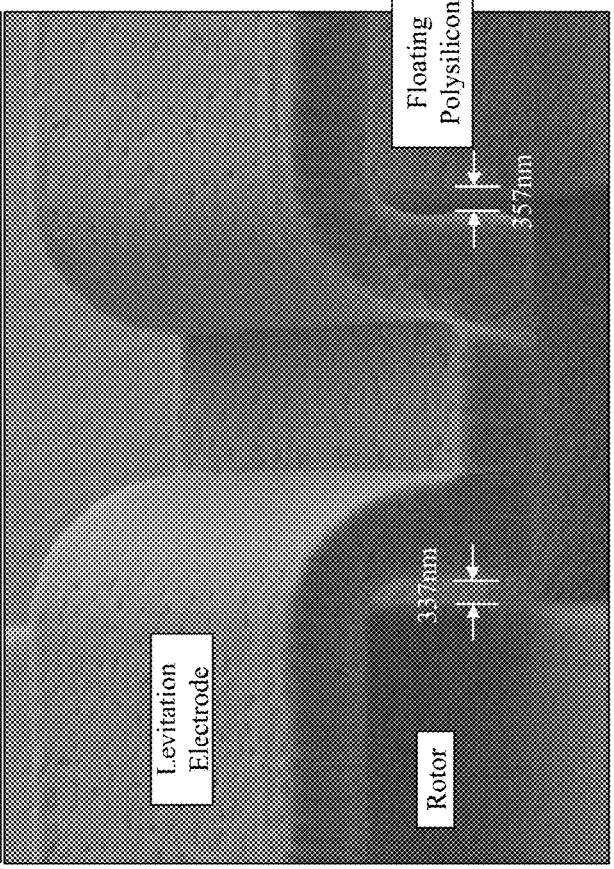
FIG. 36 depicts an SEM image comprising supporting beam overhang near floating polysilicon within a levitating rotor based micromotor according to an embodiment of the invention.

The floating polysilicon structure should be removed before motor operation and may be achieved, for example, through the use of an ultrasonic bath action or mechanical micro-manipulation. Accordingly, the issue of the support beam overhanging in the stator and rotor gap is addressed by the floating polysilicon structure but this does create a new overhang near the rotor region as evident from the SEM images in FIGS. 35 and 36 respectively. As evident the gap between the levitation electrode and the rotor/floating polysilicon is now increased, as depicted in FIG. 36 these gaps are 337 nm and 357 nm respectively. Whilst this overhang may hamper rotor motion slightly, by introducing friction, the motor remains viably movable.

Figure 37:
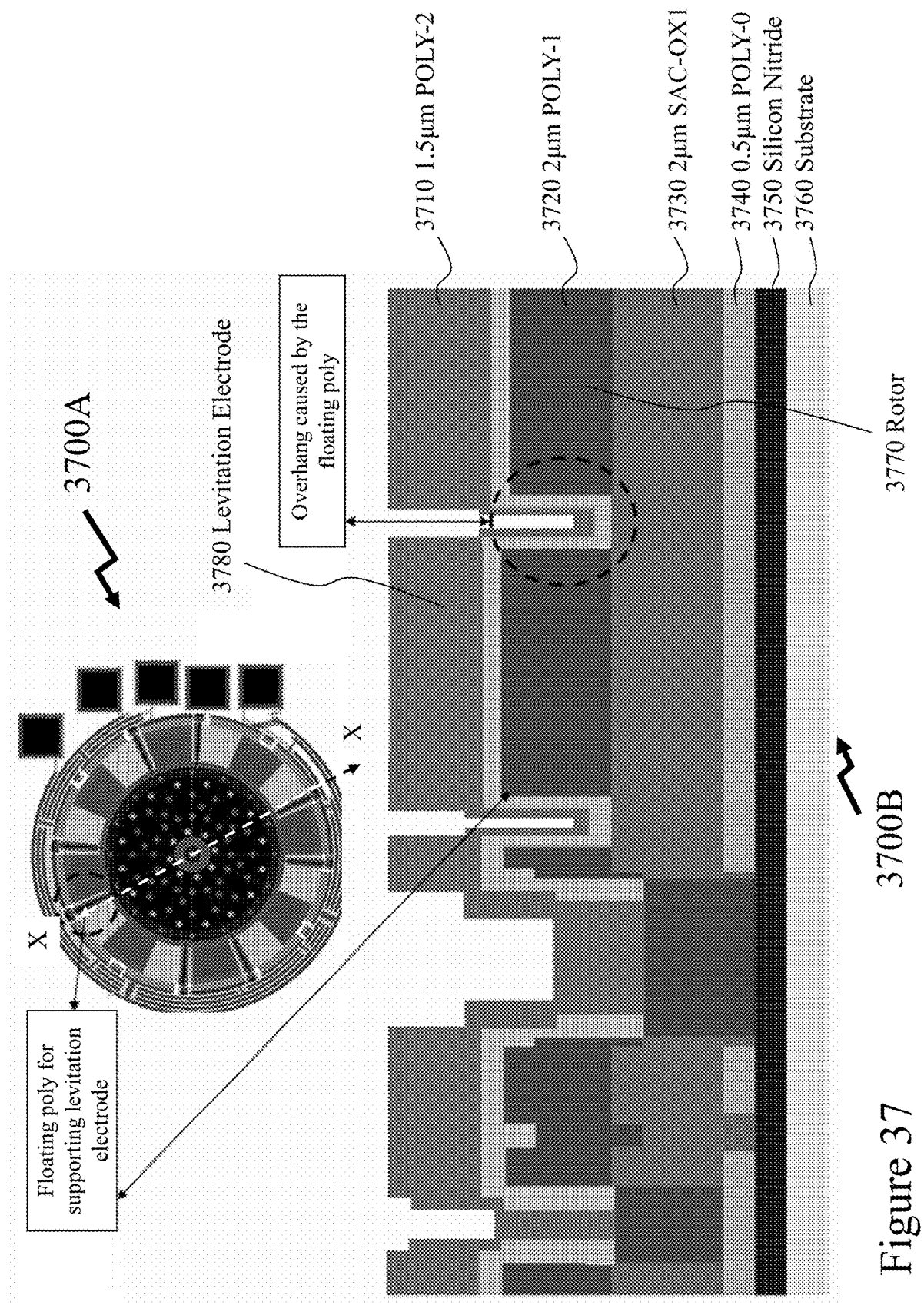
FIG. 37 depicts a schematic comprising cross-section of levitating rotor based micromotor according to an embodiment of the invention with levitation electrode and floating polysilicon.

Within embodiments of the invention the inventors have fabricated levitating rotor motors exploiting are fabricated using the POLYMUMPS™ process from MEMSCAP. Accordingly, the thicknesses of the various structural layers and sacrificial oxide are standard and fixed in the fabrication technology for this commercial foundry process. Accordingly, the electrode for levitation is fabricated using a POLY-2 layer of the POLYMUMPS™ process whilst the and stators/rotors electrodes are fabricated using the POLY-1 layer. The thickness of the sacrificial oxide between POLY-1 and POLY-2 layer within the POLYMUMPS™ is 750 nm and the oxide deposition is conformal, due to which levitation electrode hangs into the stator-rotor gap. Referring to FIG. 18 there is depicted a cross-section view of the levitation electrode. The clearance between the rotor and the hub is also 750 nm due to which the levitation electrode may touch the rotor during rotation. Similarly, the overhang will touch the rotor in floating polysilicon design variants as depicted in FIG. 37. Accordingly, within FIG. 37 there is depicted a plan view 3700A of a micromotor according to an embodiment of the invention together with section X-X which is depicted in cross-section view 3700B. Within this cross-section view 3700B the floating polysilicon design being depicted mid-process as comprising the levitation electrode 3780 within the uppermost 1.5 µm POLY-2 3710 whilst the rotor 3770 is formed within the 2 µm POLY-1 3720. Below this are the 2 µm sacrificial oxide (SAC-OX1) 3730, 0.5 µm polysilicon (POLY-0) 3740, silicon nitride 3750 and substrate 3760.

Figure 38:
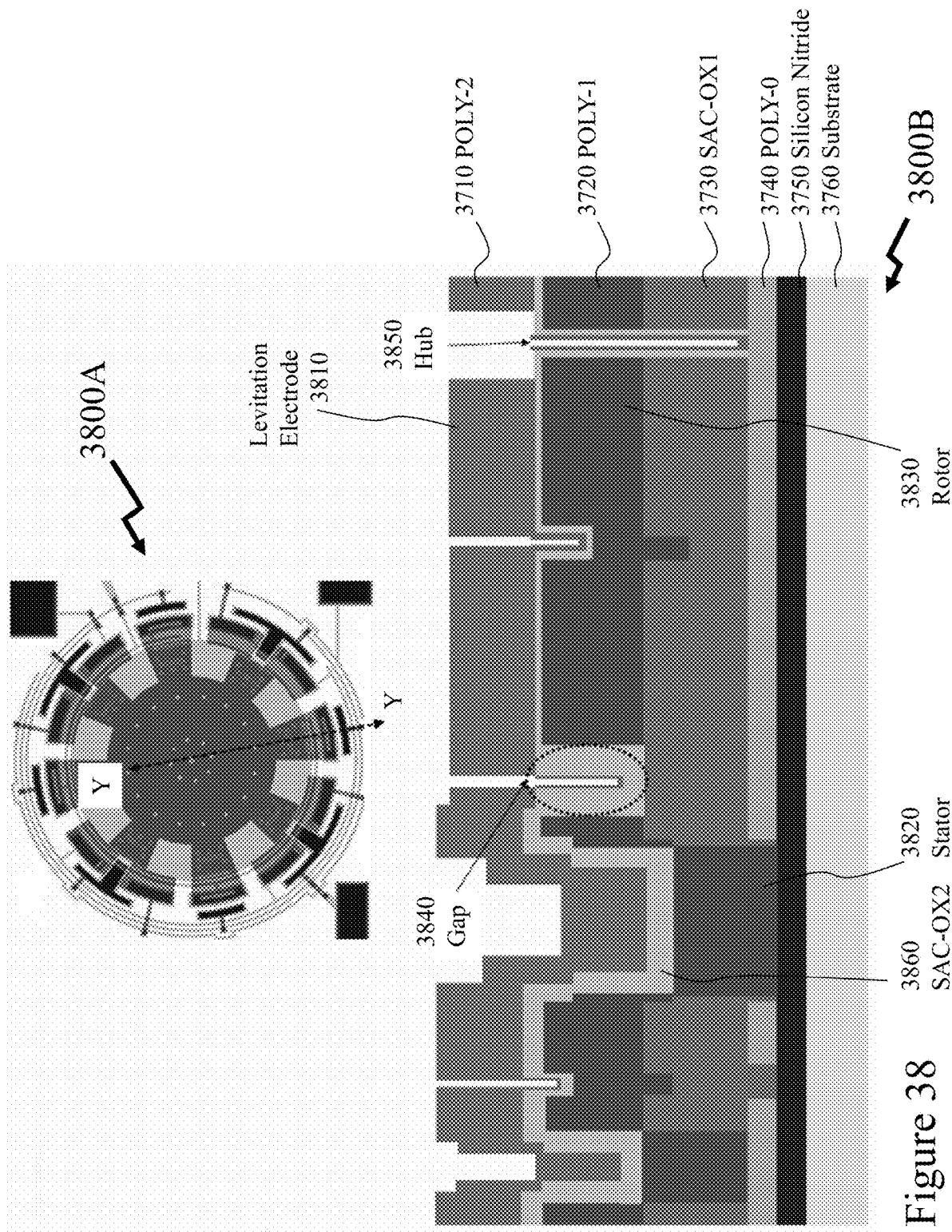
FIG. 38 depicts a schematic comprising cross-section of a levitating rotor based micromotor according to an embodiment of the invention with different clearance at the hub and the gap.
Figure 39:
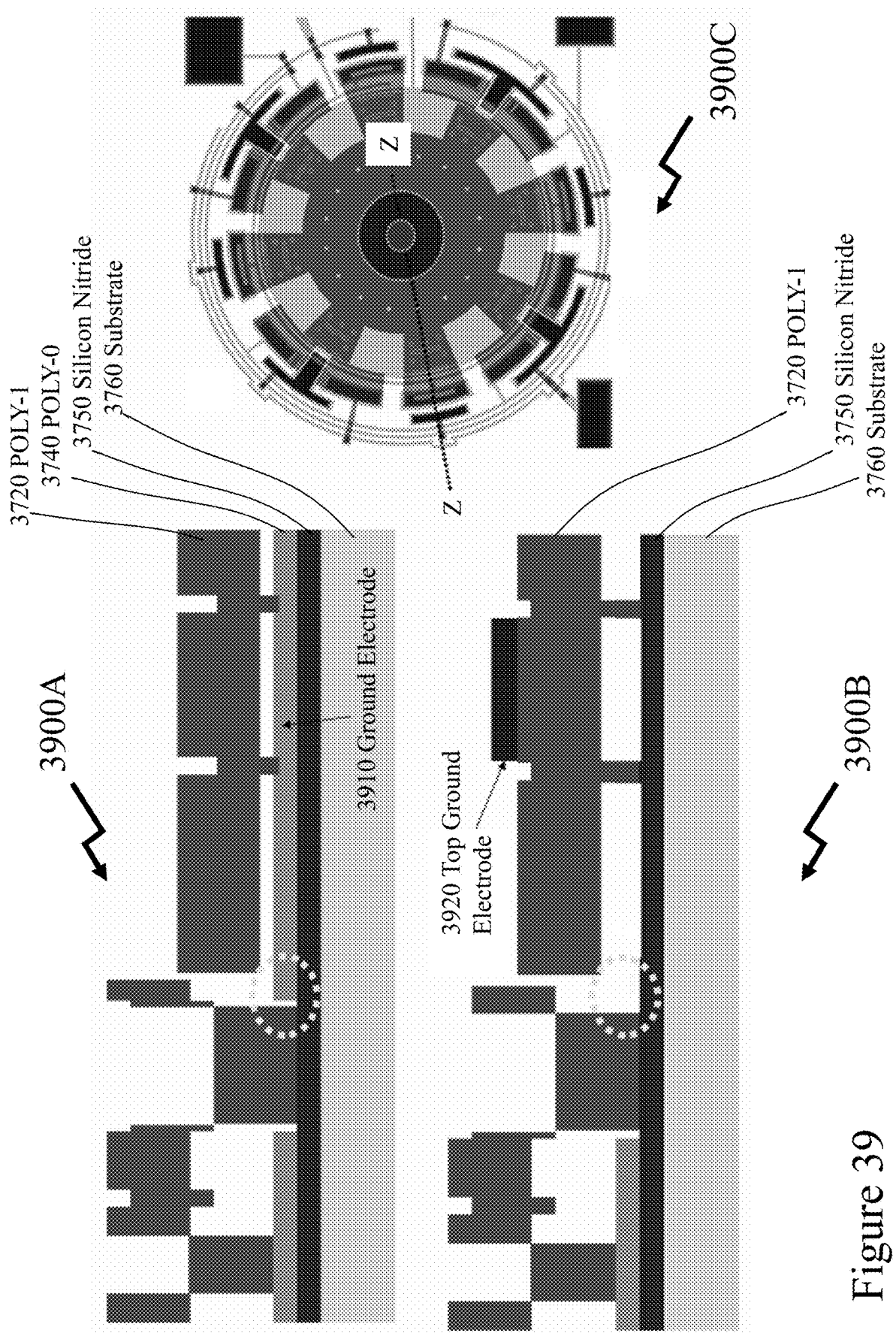
FIG. 39 depicts a schematic comprising cross-section of a levitating rotor based micromotor according to an embodiment of the invention with top electrode for ground connection.

Whilst the gap size between the stator and the rotor can be increased to avoid accumulation/overlap of POLY-2 layer 3710 near the gap for structural integrity, this may impact the levitating micromotor operation due to reduced electrostatic drive. The fabrication limitation can be overcome by adopting an alternative process which allows for the oxide thickness to be varied in the gap and near the hub/rotor clearance. Accordingly, within FIG. 38 there is depicted a plan view 3800A of a micromotor according to an embodiment of the invention together with section Y-Y which is depicted in cross-section view 3800B. Accordingly, this depicts the variable thickness sacrificial oxide layer (SAC-OX2) 3860 between the levitation electrode and the stator/rotor electrode. The distance covered by the rotor is the same as the thickness of the SAC-OX2 3860 around the hub thus clearance between the rotor and the hub will be small and the translation motion of the rotor, will be tighter. The thickness of the SAC-OX2 near the gap between the rotor and the stator should be large enough such that the hanging part of the levitation electrode never touches the rotor. Accordingly, typically the thickness of the SAC-OX2 3860 near the gap is greater than the thickness in the hub region to avoid connection between the levitation electrode and the rotor.

Within cross-section view 3800B this floating polysilicon design with variable SAC-OX2 3860 being depicted mid-process as comprising the levitation electrode 3810 within the uppermost 1.5 µm POLY-2 3710 whilst the rotor 3830 is formed within the 2 µm POLY-1 3720. Below this are the 2 µm sacrificial oxide (SAC-OX1) 3730, 0.5 µm polysilicon (POLY-0) 3740, silicon nitride 3750 and substrate 3760. The stator 3820 being depicted formed within the 2 µm POLY-1 directly on top of the silicon nitride 3750. Also depicted is the hub 3850.

Figure 40:
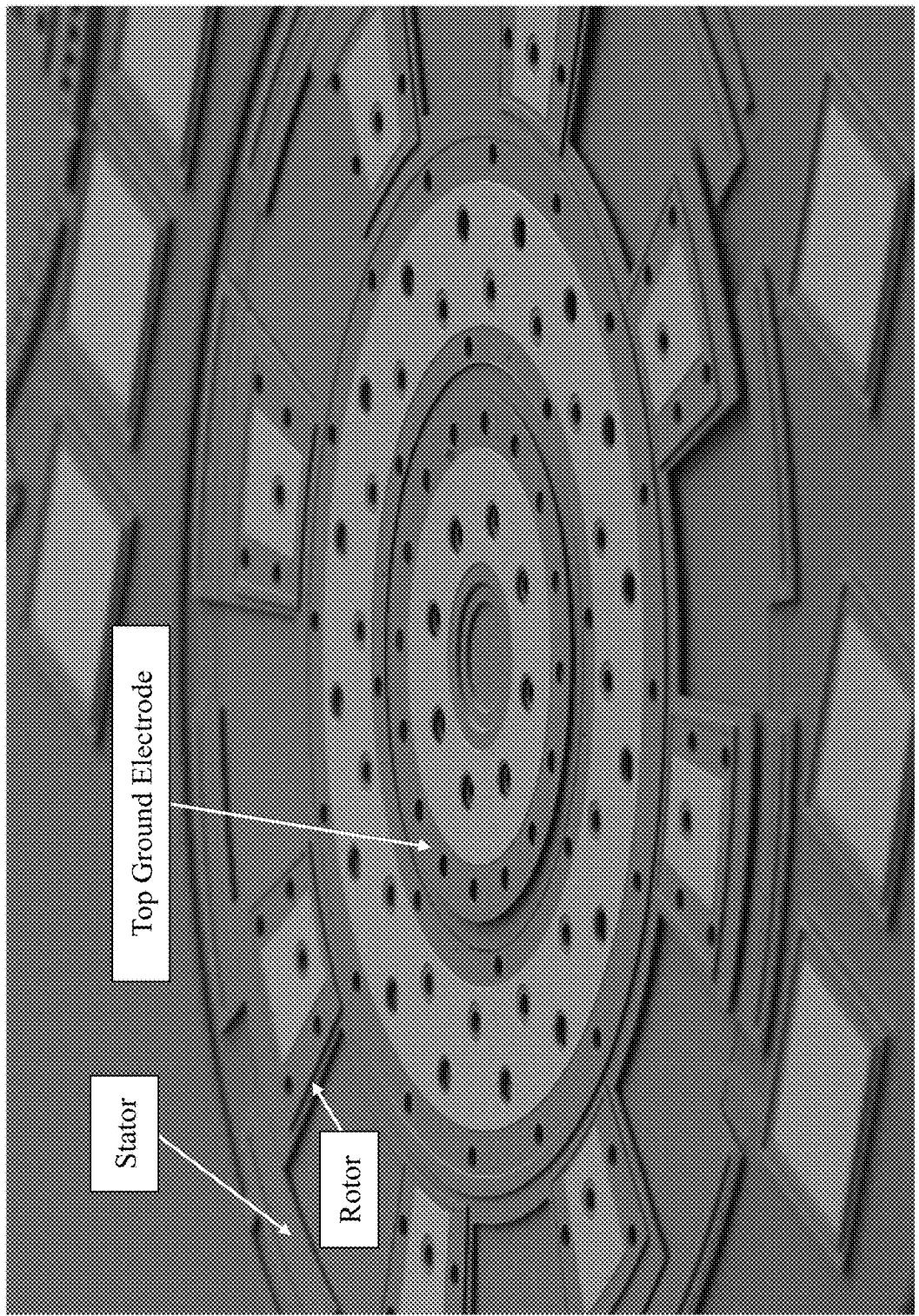
FIG. 40 depicts an SEM image of the micromotor with top ground electrode.

D6: Top Ground Electrode:

Within an alternate design according to an embodiment of the invention an improvement in the topography is obtained by using a top ground electrode that is connected to a pad via the motor central region to bias the rotor. Within the preceding designs described and depicted in respect of FIGS. 2A to 38 In all the previous designs the rotor is grounded by the POLY-0 under the rotor and the connection is made by touching the POLY-0 with the dimples. This being depicted within first cross-section 3900A wherein the rotor structure depicts the POLY-1 3720, POLY-0 3740, silicon nitride 3750 and substrate with the ground electrode 3910 being the POLY-0 3740. However, this creates topographical and vertical misalignments between the rotor and stator. As depicted within second cross-section 3900B along section Z-Z in plan view 3900C the POLY-0 can be removed. Now the ground connection is provided to the rotor within the POLY-3720 by a top electrode 3920. Accordingly, the dimples of the rotor now move across the silicon nitride 3750 atop the substrate 3760. Referring to FIG. 40 there is depicted an SEM of this top electrode design as fabricated. The achieved electrode overlap between rotor and stator is improved by this topography adjustment, yielding increased electrostatic drive.

Accordingly, as evident from the various design embodiments of the levitating micromotor fabricated using a commercial foundry process, POLYMUMPS™, successful operation cannot be performed in many cases due to the contact between the levitation electrode and the rotor, notably when the rotor-stator gap size is small in order to provide increased electrostatic drive. Accordingly, improved performance and manufacturability have been achieved in prototype devices using a non-commercial fabrication process that does not limit the modification of clearance between the hub, rotor and the hanging part of the levitation electrode. By exploiting a process with tunable clearance levitating micromotor architectures according to embodiments of the invention can be implemented with improved topology, manufacturability, and performance.

Whilst embodiments of the invention have been described and depicted with respect to a manufacturing process exploiting an SOI wafer it would be evident that other manufacturing processes and material systems may be employed without departing from the scope of the invention. For example, rather than the silicon structural layer within FIGS. 2 to 8 arising from the SOI wafer embodiments of the invention may be implemented using manufacturing sequences based upon growth—etching such that the micromotor may be implemented atop a CMOS circuit such that the control and drive electronics for the micro-motor are directly implemented within the substrate upon which the micro-motor is manufactured. Accordingly, low temperature manufacturing processes employing poly-silicon (poly-Si), silicon nitride ($Si_3N_4$), silicon oxynitride ($SiO_xN_y$), silicon carbide (SIC), graphite (C), aluminum oxide ($Al_2O_3$) may be considered. Further, variants of such manufacturing processes may provide additional options including, but not limited to, metallization on underside of rotor with electrostatic repulsion to electrode below rotor, sidewall metallization, wrap around metallization, and vias.

It would be evident that rather than forming a swept wavelength tunable optical sources that embodiments of the invention may provide swept optical receivers and swept wavelength filters.

Within embodiments of the invention described supra in respect of FIGS. 2A to 9 the rotating MOEMS (R-MOEMS) devices have been described primarily with respect to a rotor having a planar waveguide disposed around the periphery coupled to a centrally disposed structure comprising a plurality of planar reflective facets. Whilst the exploitation of convex or concave reflectors was described it would be evident to one skilled in the art that the optical waveguide may provide a range of optical functions. The planar waveguide may be passive, or it may be active. The planar waveguide may be replaced with another optical functionality including, but not limited to, one or more passive channel waveguides, one or more active channel waveguides, an active planar waveguide, a diffractive structure, a filter, and a Bragg filter. Alternatively, the planar waveguide may support a non-linear optical element or a holographic optical element.

Whilst embodiments of the invention have been presented and discussed with respect to a micro-motor based rotating MOEMS (R-MOEMS) element it would be evident that alternate electrode/control geometries may provide for partial discrete and/or intermittent rotation of the R-MOEMS rather than continuous rotation.

Whilst the embodiments of the invention have been presented and discussed with respect to a micro-motor based rotating MOEMS (R-MOEMS) element coupled to a planar waveguide structure it would be evident to one skilled in the art that the R-MOEMS may be equally applied to optical components/system/sub-systems/assemblies employing either one or more channel waveguides or one or more planar waveguides either discretely or in combination. Accordingly, optical signals may be coupled to the micro-motor R-MOEMS from one or more channel waveguides and/or one or more planar waveguides and coupled from the micro-motor R-MOEMS from one or more channel waveguides and/or one or more planar waveguides. These optical waveguides may be passive, active or a combination thereof as well as being formed from one material system or multiple material systems. These waveguides can also include integrated filtering structures such as micro-rings etc. or other passive integrated optical waveguided components. Active waveguides can be used to form structures acting as but not limited to photodetectors, variable optical attenuator, optical amplifiers, optical sources and/or optical modulators.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A device comprising:
   a substrate;
   a first optical waveguide supporting propagation of optical signals within a predetermined wavelength range disposed upon the substrate coupled via a first facet with a first predetermined geometry to a rotatable microoptoelectromechanical system (R-MOEMS); and
   the R-MOEMS comprising:
      a rotor having a periphery, a central mounting, and plurality of rotor poles;
      a plurality of stator poles;
      a second optical waveguide disposed upon the rotor comprising a second facet with a second predetermined geometry around a predetermined portion of the periphery of the rotor and a third facet with a third predetermined geometry disposed towards the center of the rotor; and
      an optical feature coupled to the third facet.

2. The device according to claim 1, wherein
at least one of:
   the first predetermined geometry of the first facet and the second predetermined geometry of the second facet are each a predetermined portion of a circle; and
   the third predetermined geometry of the third facet is a polygon.

3. The device according to claim 1, wherein
the rotor is electrostatically levitated.

4. The device according to claim 1, wherein
at least one of:
   the device further comprises a third optical waveguide comprising a wavelength dispersive element such that the R-MOEMS in combination with the first to third optical waveguides provides one or more continuous wavelength sweeps per rotation of the rotor; and
   the R-MOEMS comprises a central bearing and a plurality of structures disposed on a lower surface of the rotor to support the rotor and provide a low friction interface during rotation.

5. The device according to claim 1, wherein
the optical feature is at least one of a planar reflective structure, a convex reflective structure, a concave reflective structure, a refractive structure, a diffractive structure, and a Bragg structure.

6. The device according to claim 1, wherein
the rotor has one or more electrodes disposed upon an upper surface of the rotor to provide a ground connection for the rotor.

7. An optical component for optically scanning a predetermined wavelength range comprising:
a rotatable microoptoelectromechanical system (R-MOEMS); wherein
the R-MOEMS comprises:
   a substrate;
   a rotor with a central support;
   a plurality of rotor poles disposed in predetermined relationship around the rotor;
   a plurality of stator poles disposed in predetermined relationship to the rotor;
   a first optical waveguide disposed upon the rotor comprising a first facet along a predetermined portion of the periphery of the rotor and a second facet with a predetermined geometry disposed towards the center of the rotor; and
   an optical feature disposed upon the second facet.

8. The optical component according to claim 7, wherein
the rotor has one or more electrodes disposed upon an upper surface of the rotor to provide a ground connection for the rotor.

9. The optical component according to claim 7, further comprising
at least one second optical waveguide of a plurality of second optical waveguides, each second optical waveguide disposed at a predetermined position relative to the rotor and having a first end at a facet of a structure upon the substrate disposed adjacent the periphery of the rotor.

10. The optical component according to claim 9, wherein
at least one of:
   each second optical waveguide is either a planar optical waveguide or a channel optical waveguide; and
   the optical feature is at least one of a planar reflective structure, a convex reflective structure, a concave reflective structure, a refractive structure, diffractive structure, and a Bragg structure.

11. The optical component according to claim 7, wherein
at least one of a:
   the first facet of the first optical waveguide at the periphery of the rotor is anti-reflection coated; and
   the predetermined geometry of the second facet is a polygon.

12. The optical component according to claim 7, wherein
the rotor is electrostatically levitated.

13. The optical component according to claim 7, wherein
the rotor further comprises a plurality of structures disposed on a lower surface of the rotor to support the rotor and provide a low friction interface during rotation.

14. A device comprising:
a substrate;
a first optical waveguide supporting propagation of optical signals within a predetermined wavelength range disposed upon the substrate coupled via a first facet with a first predetermined geometry to a first rotatable microoptoelectromechanical system (R-MOEMS);
the first R-MOEMS comprising:
   a rotor having a periphery and a central mounting, and
   a second optical waveguide disposed upon the rotor comprising a second facet with a second predetermined geometry around a predetermined portion of the periphery of the rotor and a third facet with a third predetermined geometry disposed towards the center of the rotor; and
   an optical feature coupled to the third facet; and
a second R-MOEMS comprising:
   a rotor having a periphery, a central mounting, and plurality of rotor poles;
   a plurality of stator poles; wherein
rotational motion of the second R-MOEMS under electrical control results in rotational motion of the first R-MOEMS.

15. The device according to claim 14, wherein
the rotational motion of the second R-MOEMS directly results in the rotational motion of the first R-MOEMS directly or indirectly through one or more intermediate MEMS gears.

16. An optical component for optically scanning a predetermined wavelength range comprising:
a rotatable microoptoelectromechanical system (R-MOEMS); wherein
the R-MOEMS comprises:
   a substrate;
   a rotor with a central support;
   an optical waveguide disposed upon the rotor comprising a first facet along a predetermined portion of the periphery of the rotor and a second facet with a predetermined geometry disposed towards the center of the rotor; and
   an optical feature disposed upon the second facet.

17. The optical component according to claim 16, wherein
at least one of:
   the R-MOEMS further comprises a plurality of rotor poles disposed in predetermined relationship around the rotor and a plurality of stator poles disposed in predetermined relationship to the rotor on the substrate; and
   the optical waveguide comprises at least one of a planar waveguide, a channel waveguide, an array of channel waveguides, a filter, a passive optical component, a diffractive optical component, an active planar waveguide, an active channel waveguide, a non-linear optical element, and a holographic optical element.

18. The optical component according to claim 16, wherein the R-MOEMS comprises:
    a central spindle;
    a rotor having a central portion disposed around the spindle and a plurality N arms radially extending from the central portion to a predetermined distance from centre of the spindle;
    a plurality N stators disposed at predetermined locations around the periphery of the rotor such that a predetermined gap exists between the outer edge of the plurality N arms and an inner facing edge of each of the plurality N stators;
    a plurality of M supports on the surface of the rotor facing a substrate upon which the MEMS is formed extending from the surface of the rotor by a predetermined distance which support the rotor;
    a plurality N top electrodes elements disposed at predetermined locations relative to the plurality N stators extending from a predetermined location beyond the periphery of the rotor to a predetermined distance from the centre of the spindle; wherein
    each top electrode is separated from the other surface of the rotor to that having the supports by a predetermined distance.

19. The optical component according to claim 18, wherein at least one of:
    the plurality N top electrodes are connected centrally above the central spindle; and
    the plurality N top electrodes are connected to a predetermined electrical potential such that a resulting electrostatic attractive force between the plurality N top electrodes and the rotor levitates the rotor relative to the substrate.

* * * * *